(12) United States Patent
Gao et al.

(10) Patent No.: US 11,960,067 B2
(45) Date of Patent: Apr. 16, 2024

(54) ZOOM LENS GROUP

(71) Applicant: ZHEJIANG SUNNY OPTICS CO., LTD., Zhejiang (CN)

(72) Inventors: Yang Gao, Zhejiang (CN); Kaiyuan Zhang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 40 days.

(21) Appl. No.: 17/147,484

(22) Filed: Jan. 13, 2021

(65) Prior Publication Data

US 2021/0318527 A1 Oct. 14, 2021

(30) Foreign Application Priority Data

Apr. 2, 2020 (CN) .......................... 202010258588.6

(51) Int. Cl.
| | |
|---|---|
| *G02B 15/14* | (2006.01) |
| *G02B 7/04* | (2021.01) |
| *G02B 13/06* | (2006.01) |

(52) U.S. Cl.
CPC .......... *G02B 15/1455* (2019.08); *G02B 7/04* (2013.01); *G02B 13/06* (2013.01)

(58) Field of Classification Search
CPC .. G02B 13/006; G02B 13/009; G02B 15/143; G02B 15/1435; G02B 15/143507; G02B 15/1455; G02B 7/04; G02B 13/06; G02B 15/177; G02B 27/646; G02B 15/14; G02B 27/64

USPC ........ 359/557, 676–677, 680–683, 686–689, 359/713, 774, 781–784
See application file for complete search history.

(56) References Cited

U.S. PATENT DOCUMENTS

| | | | | |
|---|---|---|---|---|
| 6,349,002 | B1* | 2/2002 | Shibayama | .... G02B 15/143507 359/689 |
| 7,227,695 | B2* | 6/2007 | Enomoto | ............. G02B 15/177 359/689 |
| 8,885,265 | B2* | 11/2014 | Kuzuhara | ............ G02B 15/177 359/557 |
| 2010/0265594 | A1* | 10/2010 | Matsui | ........... G02B 15/143507 359/689 |
| 2011/0096407 | A1* | 4/2011 | Ohata | ............ G02B 15/143507 359/689 |
| 2011/0310286 | A1* | 12/2011 | Arakawa | ........ G02B 15/144515 359/683 |

* cited by examiner

*Primary Examiner* — Thomas K Pham
*Assistant Examiner* — Kuei-Jen L Edenfield
(74) *Attorney, Agent, or Firm* — Samson G. Yu

(57) ABSTRACT

The disclosure discloses a zoom lens group. The zoom lens group sequentially includes from an object side to an image side along an optical axis: a first lens group having a negative refractive power, the first lens group including a first lens and a second lens which are sequentially arranged along the optical axis; a second lens group having a positive refractive power, the second lens group including a third lens, a fourth lens and a fifth lens which are sequentially arranged along the optical axis; and a third lens group having a positive refractive power, a separation distance between the first lens group and the second lens group on the optical axis and a separation distance between the second lens group and the third lens group on the optical axis are adjusted, so as to switch the zoom lens group from a wide-angle state to a long-focus state.

5 Claims, 38 Drawing Sheets

ZOOM LENS GROUP

CROSS-REFERENCE TO RELATED DISCLOSURES

The application claims priority to Chinese Patent Disclosure No. 202010258588.6, filed to the National Intellectual Property Administration, PRC (CNIPA) on Apr. 2, 2020, the disclosure of which is hereby incorporated by reference in its entirety.

TECHNICAL FIELD

The disclosure relates to the field of optical elements, and particularly, the disclosure relates to a zoom lens group.

BACKGROUND

With the development of photographing technology and the rise of Internet industry, users have higher and higher requirements on the photographing level and the photographing quality of Mobile devices such as smartphones and cameras. Currently, a method commonly used by lens manufacturers in the art for optimizing the lens imaging quality is to use a combination of a super-definition main camera, a super wide-angle and a telephoto lens. However, at present, for said combined lenses on the market, when photographing different scenes, different lenses need to be switched to complete zooming.

The zooming of the current rear camera is usually "relay rod" zooming, that, is, "continuous" zooming in a non-true optical sense is achieved by switching use between wide-angle, main camera and telephoto. In addition, installing multiple lenses in a mobile device not only greatly occupies the internal space of the mobile device; but also causes many problems such as high costs, a large size and a large increase in weight.

SUMMARY

The disclosure provides a zoom lens group. The zoom lens group sequentially includes from an object side to an image side along an optical axis: a first lens group having a negative refractive power, the first lens group including a first lens and a second lens which are sequentially arranged along the optical axis, wherein the first lens and the second lens are glued to form a first cemented lens; a second lens group having a positive refractive power, the second lens group including a third lens, a fourth lens and a fifth lens which are sequentially arranged along the optical axis, wherein the fourth lens and the fifth lens are glued to form a second cemented lens; and a third lens group having a positive refractive power, the third lens group including a sixth lens; a separation distance between the first lens group and the second lens group on the optical axis and a separation distance between the second lens group and the third lens group on the optical axis are adjusted, so as to switch the zoom lens group from a wide-angle state to a long-focus state; and a total effective focal length FT of the zoom lens group in the long-focus state and a total effective focal length FW of the zoom lens group in the wide-angle state may satisfy: $FT/FW \geq 2.0$.

In an embodiment, at least one of an object-side surface of the first lens to an image-side surface of the sixth lens is an aspherical mirror surface.

In an embodiment, an effective focal length F1 of the first lens group and an effective focal length F2 of the second lens group may satisfy: $-2.3 < F1/F2 < -1.8$.

In an embodiment, an effective focal length F3 of the third lens group and an effective focal length F1 of the first lens group may satisfy: $-1.1 < F3/F1 < -0.8$.

In an embodiment, a total effective focal length FT of the zoom lens group in a long-focus state and an effective focal length F3 of the third lens group may satisfy: $1.1 < FT/F3 < 1.6$.

In an embodiment, a maximum field of view (FOVT) of the zoom lens group in the long-focus state may satisfy: $10° < FOVT < 15°$.

In an embodiment, a curvature radius R9 of an object-side surface of the sixth lens and a curvature radius R10 of an image-side surface of the sixth lens may satisfy: $1.3 < R9/R10 < 1.4$.

In an embodiment, a curvature radius R4 of an object-side surface of the third lens and a curvature radius R6 of an object-side surface of the fourth lens may satisfy: $0.5 < R4/R6 < 1.0$.

In an embodiment, an effective focal length f11 of the first lens and an effective focal length f12 of the second lens may satisfy: $-0.7 < f11/f12 < -0.4$.

In an embodiment, an effective focal length f21 of the third lens, an effective focal length f23 of the fifth lens and an effective focal length f22 of the fourth lens may satisfy: $1.0 < (f21+f23)/f22 < 1.3$.

In an embodiment, a central thickness CT6 of the sixth lens on the optical axis, a central thickness CT1 of the first lens on the optical axis and a central thickness CT2 of the second lens on the optical axis may satisfy: $0.2 < CT6/(CT1+CT2) < 0.8$.

The disclosure provides a zoom lens group having continuous zooming, miniaturization and good imaging quality by reasonably distributing the refractive power and optimizing optical parameters.

BRIEF DESCRIPTION OF THE DRAWINGS

Other features, objects and advantages of the disclosure will become more apparent by reading the detailed description of non-limiting examples made with reference to the following figures.

DETAILED DESCRIPTION OF THE EMBODIMENTS

Figure 1:
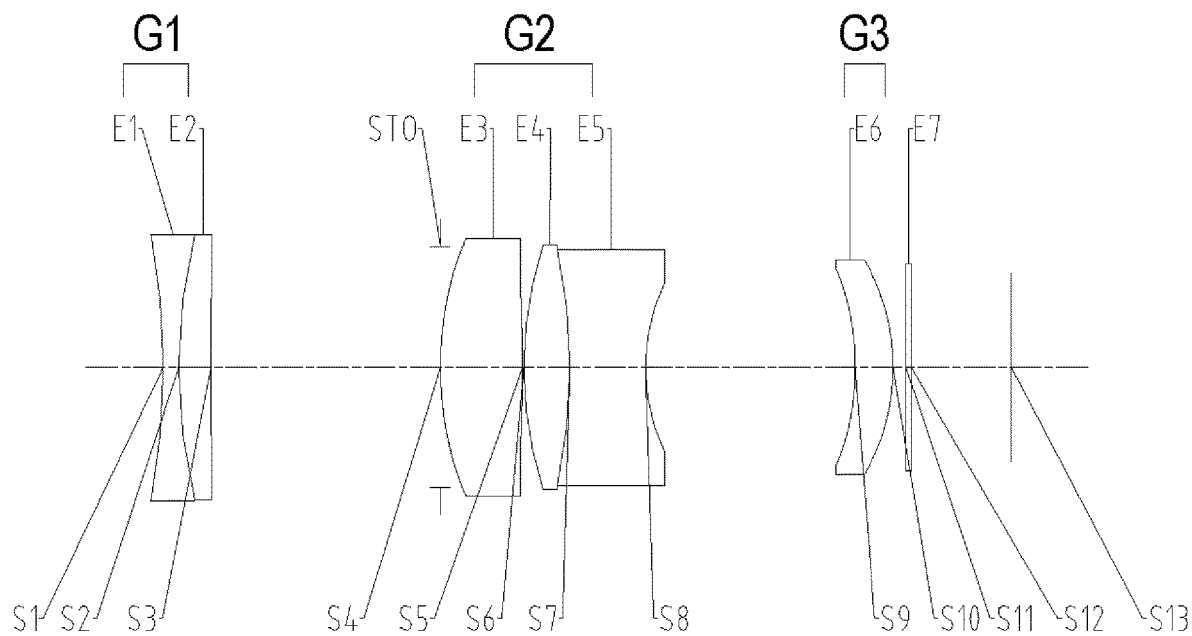
FIG. 1 shows a schematic structure diagram of a zoom lens group according to Embodiment 1 of the disclosure in a wide-angle state.

For understanding the disclosure better, more detailed descriptions will be made to each aspect of the disclosure with reference to the drawings. It is to be understood that these detailed descriptions are only descriptions about the exemplary embodiments of the disclosure and not intended to limit the scope of the disclosure in any manner. In the whole specification, the same reference signs represent the same elements. Expression "and/or" includes any and all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease of illustration. In particular, a spherical shape or an aspherical shape shown in the drawings is shown by Embodiments. That is, the spherical shape or the aspherical shape is not limited to the spherical shape or the aspherical shape shown in the drawings. The drawings are by way of Embodiment only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to a photographed object is called an object-side surface of the lens, and a surface of each lens closest to an imaging surface is called an image-side surface of the lens.

It also should be understood that terms "include", "including", "have", "contain" and/or "containing", used in this description, represent existence of a stated feature, element and/or component but do not exclude existence or addition of one or more other features, elements, components and/or combinations thereof. In addition, expressions like "at least one in . . . " may appear after a list of listed features not to modify an individual element in the list but to modify the listed features. Moreover, when the embodiments of the disclosure are described, "may" is used to represent "one or more embodiments of the disclosure". Furthermore, term "exemplary" refers to an example or exemplary description.

Unless otherwise defined, all terms (including technical terms and scientific terms) used in the disclosure have the same meanings usually understood by a person of ordinary skill in the field to which the disclosure belongs. It also should be understood that the terms (for example, terms defined in a common dictionary) should be explained to have meanings consistent with the meanings in the context of related technique and can not be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

The zoom lens group according to an exemplary embodiment of the disclosure may include six lenses each having a refractive power, which are respectively: a first lens group, including a first lens and a second lens; a second lens group, including a third lens, a fourth lens, and a fifth lens; and a third lens group, including a sixth lens. The six lenses are arranged sequentially from an object side to an image side along an optical axis.

In an exemplary embodiment, the first lens group may have a negative refractive power; the second lens group may have a positive refractive power; and the third lens group may have a positive refractive power.

In an exemplary embodiment, the first lens and the second lens may be glued to form a first cemented lens; and the fourth lens and the fifth lenses may be glued to form a second cemented lens. The first cemented lens and the second cemented lens may jointly achieve the effect of optimizing the chromatic aberration of a system, and may meet the requirement of machinability.

In an exemplary embodiment, changing a separation distance between the first lens group and the second lens group on the optical axis and a separation distance between the second lens group and the third lens group on the optical axis can enable to switch the zoom lens group from a wide-angle state to a long-focus state. By reasonably distributing the refractive power of the system, when the system is in a wide-angle state, the distance of a zooming group formed by the first lens group and the second lens group is the maximum, and the distance of a compensating group formed by the second lens group and the third lens group is the minimum, so as to achieve the purposes of a minimum focal length and a maximum field of view of the system. When the system zooms to a long-focus state, the distance of a zooming group formed by the first lens group and the second lens group is shortened, the distance of a compensating group formed by the second lens group and the third lens group is lengthened, and the ratio of a total system focal length of a telephoto end to a total system focal length of a wide-angle end continuously changes, thereby completing a continuous zooming process of an optical imaging system.

In an exemplary embodiment, the zoom lens group according to the disclosure may satisfy: FT/FW≥2.0, wherein FT is a total effective focal length of the zoom lens group in a long-focus state, and FW is a total effective focal length of the zoom lens group in a wide-angle state. Satisfying FT/FW≥2.0 facilitates continuous zooming of the zoom lens group, such that the zoom lens group has a good imaging quality, and a total effective focal length of an optical whole system is appropriately adjusted, such that the optical imaging system has the characteristic of continuous zooming.

In an exemplary embodiment, the zoom lens group according to the disclosure may satisfy: −2.3<F1/F2<1.8, wherein F1 is an effective focal length of the first lens group, and F2 is an effective focal length of the second lens group. More specifically, F1 and F2 may further satisfy: −2.2<F1/F2<−1.9. Satisfying −2.3<F1/F2<−1.8 may enable reasonable control of the contribution range of an effective focal length of the first lens group and an effective focal length of the second lens group, and may also enable reasonable control of the contribution ratio of spherical aberration of the first lens group and the second lens group.

In an exemplary embodiment, the zoom lens group according to the disclosure may satisfy: −1.1<F3/F1<−0.8, wherein F3 is an effective focal length of the third lens group, and F1 is an effective focal length of the first lens group. Satisfying −1.1<F3/F1<−0.8 may not only enable the third lens group to bear a negative refractive power required by the system, but also enable the spherical aberration contributed by the third lens group to be within a reasonably controllable range, so that the image quality in a longitudinal field of view of the system can be well ensured.

In an exemplary embodiment, the zoom lens group according to the disclosure may satisfy: 1.1<FT/F3<1.6, wherein FT is a total effective focal length of the zoom lens group in a long-focus state, and F3 is an effective focal length of the third lens group. Satisfying 1.1<FT/F3<1.6 enables the zoom lens group to have lenses with a reasonable positive refractive power, so as to balance with an aberration generated by a lens group having a negative refractive power at a front end, thereby obtaining a good imaging quality and realizing the effect of a high resolution power.

In an exemplary embodiment, the zoom lens group according to the disclosure may satisfy: 10°<FOVT<15°, wherein FOVT is a maximum field of view of the zoom lens group in a long-focus state. More specifically, FOVT may further satisfy: 10°<FOVT<13°. Satisfying 10°<FOVT<15° facilitates the achievement of a long-focus characteristic of the zoom lens group.

In an exemplary embodiment, the zoom lens group according to the disclosure may satisfy: 1.3<R9/R10<1.4, wherein R9 is a curvature radius of an object-side surface of the sixth lens, and R10 is a curvature radius of an image-side surface of the sixth lens. Satisfying 1.3<R9/R10<1.4 may enable effective constraint of the shape of the sixth lens, thereby effectively controlling the aberration contribution ratio of the object-side surface and the image-side surface of the sixth lens, effectively balancing the aberration related to an aperture band of the system, and further effectively improving the imaging quality of the system.

In an exemplary embodiment, the zoom lens group according to the disclosure may satisfy: 0.5<R4/R6<1.0, wherein R4 is a curvature radius of an object-side surface of the third lens, and R6 is a curvature radius of an object-side surface of the fourth lens. Satisfying 0.5<R4/R6<1.0 may enable effective constraint of the aberration contribution ratio of object-side surfaces of the third lens and the fourth lens, thereby effectively balancing the aberration related to an aperture band of the system, and further effectively improving the imaging quality of the system.

In an exemplary embodiment, the zoom lens group according to the disclosure may satisfy: $-0.7<f11/f12<-0.4$, wherein f11 is an effective focal length of the first lens, and f12 is an effective focal length of the second lens. More specifically, f11 and f12 may further satisfy: $-0.7<f11/f12<-0.5$. Satisfying $-0.7<f11/f12<-0.4$ may enable to control the contribution amount of the aberration of the first lens and the second lens, so as to balance with the aberration generated by an optical lens at the rear end, so that the system aberration is in the state of a reasonable level, and thus the zoom lens group has a good imaging quality.

In an exemplary embodiment, the zoom lens group according to the disclosure may satisfy: $1.0<(f21+f23)/f22<1.3$, wherein f21 is an effective focal length of the third lens, f23 is an effective focal length of the fifth lens, and f22 is an effective focal length of the fourth lens. Satisfying $1.0<(f21+f23)/f22<1.3$ may not only ensure that the optical system has a good image quality, but also ensure that the system has good machinability.

In an exemplary embodiment, the zoom lens group according to the disclosure may satisfy: $0.2<CT6/(CT1+CT2)<1.8$, wherein CT6 is a central thickness of the sixth lens on the optical axis, CT1 is a central thickness of the first lens on the optical axis, and CT2 is a central thickness of the second lens on the optical axis. Satisfying $0.2<CT6/(CT1+CT2)<1.8$ may ensure that the zoom lens group has good machinability.

In an exemplary embodiment, the zoom lens group according to the disclosure further includes a diaphragm provided between the first lens group and the second lens group. Optionally, the described zoom lens group may further include an optical filter for correcting color deviation and/or protective glass for protecting a photosensitive element on the imaging surface. The disclosure proposes a zoom lens group having characteristics of continuous zooming, high integration level, miniaturization, high imaging quality, etc. The zoom lens group according to the embodiments above of the disclosure may use multiple lenses, for example, seven lenses as described above. By reasonably distributing the refractive power and surface type of each lens, the central thickness of each lens; the longitudinal distance between the lenses, etc., incident light rays can be effectively converged, the overall optical length of imaging lenses can be reduced and the machinability of the imaging lenses can be improved, so that the zoom lens group facilitates production and machining.

In an embodiment of the disclosure, at least one of mirror surfaces of the lenses is an aspherical mirror surface, that is, at least one mirror surface of an object-side surface of the first lens to an image-side surface of the sixth lens is an aspherical mirror surface. An aspherical lens has characteristics that the curvature keeps changing from a center of the lens to a periphery of the lens. Unlike a spherical lens with a constant curvature from a center of the lens to a periphery of the lens, an aspherical lens has a better curvature radius characteristic and the advantages of improving distortion aberration and improving astigmatic aberration. With the adoption of an aspherical lens, the aberration generated during imaging can be eliminated as much as possible, thereby improving the imaging quality. Optionally, at least one of an object-side surface and an image-side surface of each lens of the first lens, the second lens, the third lens, the fourth lens, the fifth lens and the sixth lens is an aspherical mirror surface. Optionally, both an object-side surface and an image-side surface of each lens of the first lens, the second lens, the third lens, the fourth lens, the fifth lens and the sixth lens are aspherical mirror surfaces.

However, a person skilled in the art would understand that the number of lenses forming the zoom lens group may be changed without departing from the technical solutions claimed in the disclosure, so as to achieve results and advantages described in the description. For example, although descriptions are made in the embodiments with six lenses as an embodiment, the zoom lens group is not limited to including six lenses. If necessary, the zoom lens group may further include other number of lenses.

Specific embodiments of the zoom lens group applicable to the embodiments above are further described below with reference to the accompanying drawings.

Embodiment 1

Figure 2:
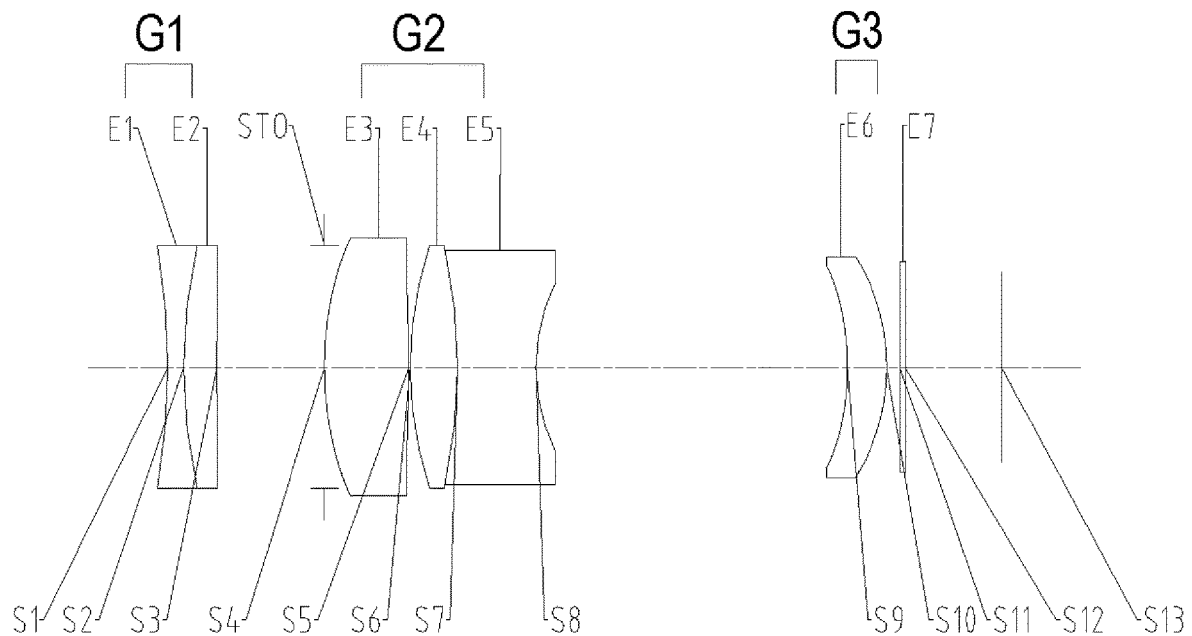
FIG. 2 shows a schematic structure diagram of the zoom lens group according to Embodiment 1 of the disclosure in an intermediate state during switching from a wide-angle state to a long-focus state.
Figure 3:
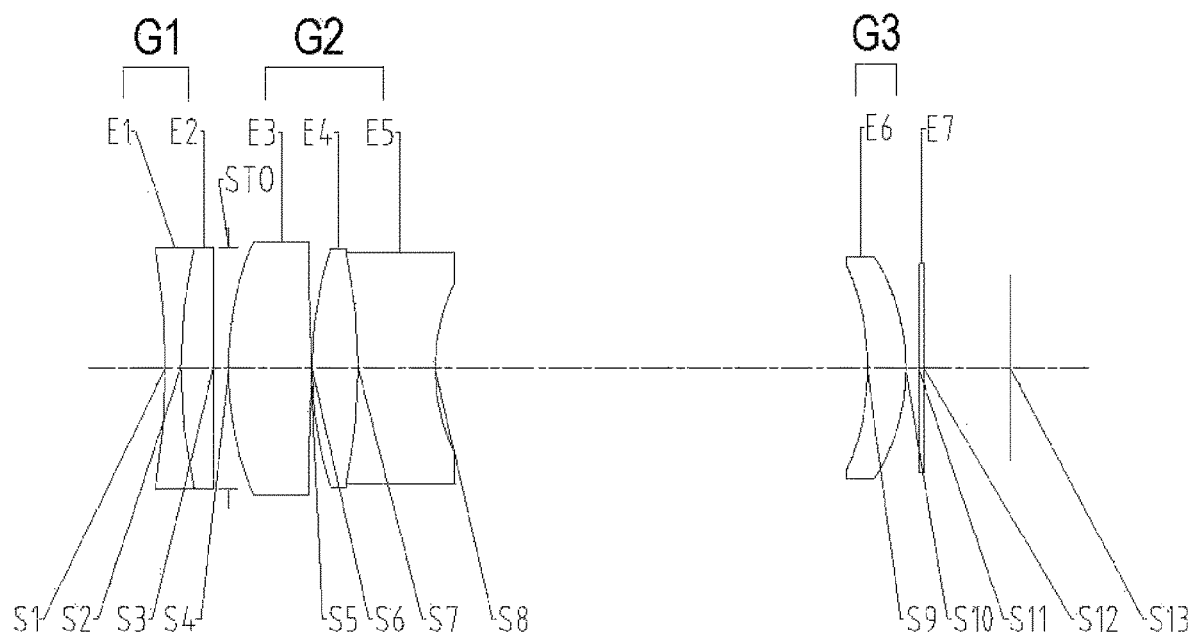
FIG. 3 shows a schematic structure diagram of the zoom lens group according to Embodiment 1 of the disclosure in a long-focus state.

A zoom lens group according to Embodiment 1 of the disclosure is described below with reference to FIG. 1 to FIG. 6D. FIG. 1 shows a schematic structure diagram of a zoom lens group according to Embodiment 1 of the disclosure in a wide-angle state. FIG. 2 shows a schematic structure diagram of the zoom lens group according to Embodiment 1 of the disclosure in an intermediate state during switching from a wide-angle state to a long-focus state. FIG. 3 shows a schematic structure diagram of the zoom lens group according to Embodiment 1 of the disclosure in a long-focus state.

As shown in FIG. 1 to FIG. 3, the zoom lens group sequentially includes from an object side to an image side: a first lens group G1 (a first lens E1 and a second lens E2), a diaphragm STO, a second lens group G2 (a third lens E3, a fourth lens E4 and a fifth lens E5), a third lens group G3 (a sixth lens E6), an optical filter E7 and an imaging surface S13.

An object-side surface S1 of the first lens E1 is a concave surface, and an image-side surface S2 thereof is a concave surface. An object-side surface S2 of the second lens E2 is a convex surface, and an image-side surface S3 thereof is a concave surface. An object-side surface S4 of the third lens E3 is a convex surface, and an image-side surface S5 thereof is a convex surface. An object-side surface S6 of the fourth lens E4 is a convex surface, and an image-side surface S7 thereof is a convex surface. An object-side surface S7 of the fifth lens E5 is a concave surface, and an image-side surface S8 thereof is a concave surface. An object-side surface S9 of the sixth lens E6 is a concave surface, and an image-side surface S10 thereof is a convex surface. The optical filter E7 has an object-side surface S11 and an image-side surface S12. Light from an object sequentially passes through the respective surfaces S1 to S12 and is finally imaged on the imaging surface S13.

Table 1 shows basic parameters of the zoom lens group of Embodiment 1, wherein the units of curvature radius and thickness/distance are millimeter (mm).

TABLE 1

| Surface number | Surface type | Curvature radius | Thickness/ distance | Material Refractive index | Material Abbe number | Conic coefficient |
|---|---|---|---|---|---|---|
| OBJ | Spherical | Infinite | Infinite | | | |
| S1 | Spherical | −16.9947 | 0.6000 | 1.81 | 35.0 | |
| S2 | Spherical | 13.0631 | 1.2570 | 1.93 | 20.9 | |
| S3 | Spherical | 309.7454 | D3 | | | |
| STO | Spherical | Infinite | 0.0000 | | | |
| S4 | Aspherical | 8.5022 | 3.1952 | 1.55 | 56.1 | 0.0000 |
| S5 | Aspherical | −30.5481 | 0.0500 | | | 0.0000 |
| S6 | Spherical | 9.4164 | 1.7874 | 1.78 | 49.6 | |
| S7 | Spherical | −13.1394 | 2.9673 | 1.73 | 28.3 | |
| S8 | Spherical | 4.7207 | D9 | | | |
| S9 | Aspherical | −6.9254 | 1.5000 | 1.67 | 20.4 | 0.0000 |
| S10 | Aspherical | −5.0902 | 0.5000 | | | 0.0000 |
| S11 | Spherical | Infinite | 0.2100 | 1.52 | 64.2 | |
| S12 | Spherical | Infinite | D13 | | | |
| S13 | Spherical | Infinite | | | | |

In the embodiment, by changing a separation distance D3 between the first lens group and the second lens group on the optical axis (i.e., a separation distance between an image-side surface of the second lens E2 and an object-side surface of the third lens E3 on the optical axis), a separation distance D9 between the second lens group and the third lens group on the optical axis (i.e., a separation distance between an image-side surface of the fifth lens E5 and an object-side surface of the sixth lens E6 on the optical axis), and a distance D13 between an image-side surface of the optical filter and the imaging surface of the zoom lens group on the optical axis, the zoom lens group is switched from a wide-angle state to a long-focus state or from a long-focus state to a wide-angle state. A total effective focal length f, an aperture value Fno and a maximum field of view (FOV) of the zoom lens group, a total length TTL of the zoom lens group (i.e., a distance between an object-side surface S1 of the first lens E1 and the imaging surface S13 of the zoom lens group on the optical axis), and a half of the length of the diagonal length of an effective pixel region on the imaging surface S13 of the zoom lens group change along with the zoom lens group switching from a wide-angle state to a long-focus state or from a long-focus state to a wide-angle state.

Table 2 is a table of parameters changing along with different states of the zoom lens group of Embodiment 1, wherein the units of f, TTL, ImgH, D3, D9 and D13 are all millimeter (mm), and the unit of FOV is degree (°).

TABLE 2

| Parameter | Wide-angle state | Intermediate state | Long-focus state |
|---|---|---|---|
| f | 15.00 | 21.21 | 30.00 |
| Fno | 2.90 | 3.54 | 4.43 |
| FOV | 21.3 | 15.1 | 10.7 |
| TTL | 33.09 | 31.60 | 32.75 |
| ImgH | 2.83 | 2.85 | 2.83 |
| D3 | 8.96 | 4.09 | 0.60 |
| D9 | 8.16 | 11.80 | 16.74 |
| D13 | 3.90 | 3.64 | 3.34 |

In Embodiment 1, both an object-side surfaces and an image-side surfaces of the third lens E3 and the sixth lens E6 are aspherical surfaces, and the surface type x of each aspherical lens can be defined by, but not limited to, the following aspherical formula:

$$x = \frac{ch^2}{1 + \sqrt{1 - (k+1)c^2 h^2}} + \sum A_i h^i \quad (1)$$

wherein x is the distance vector height from a vertex of the aspherical surface when the aspherical surface is at a height of h along the optical axis direction; c is the paraxial curvature of the aspherical surface, c=1/R (namely, the paraxial curvature c is a reciprocal of the curvature radius R in Table 1 above); k is the conic coefficient; and $A_i$ is the i-th-order correction coefficient of the aspherical surface. The following Table 3 shows higher-order coefficients A4, A6, A8, A10, A12, A14 and A16 applicable to the aspherical mirror surfaces S4, S5, S9 and S10 in Embodiment 1.

TABLE 3

| Surface number | A4 | A6 | A8 | A10 | A12 | A14 | A16 |
|---|---|---|---|---|---|---|---|
| S4 | 6.2132E−05 | 1.9911E−05 | −3.4326E−06 | 5.9281E−07 | −5.0960E−08 | 2.2862E−09 | −4.0650E−11 |
| S5 | 4.9364E−04 | 2.1990E−05 | −3.2187E−06 | 6.6260E−07 | −6.3553E−08 | 3.2128E−09 | −6.2856E−11 |
| S9 | −7.2609E−04 | −6.8510E−05 | 1.7178E−05 | −2.4569E−06 | 1.0321E−07 | 0.0000E+00 | 0.0000E+00 |
| S10 | 3.5417E−04 | −4.8967E−05 | 1.1512E−05 | −1.2367E−06 | 4.3517E−08 | 0.0000E+00 | 0.0000E+00 |

Figure 4A:
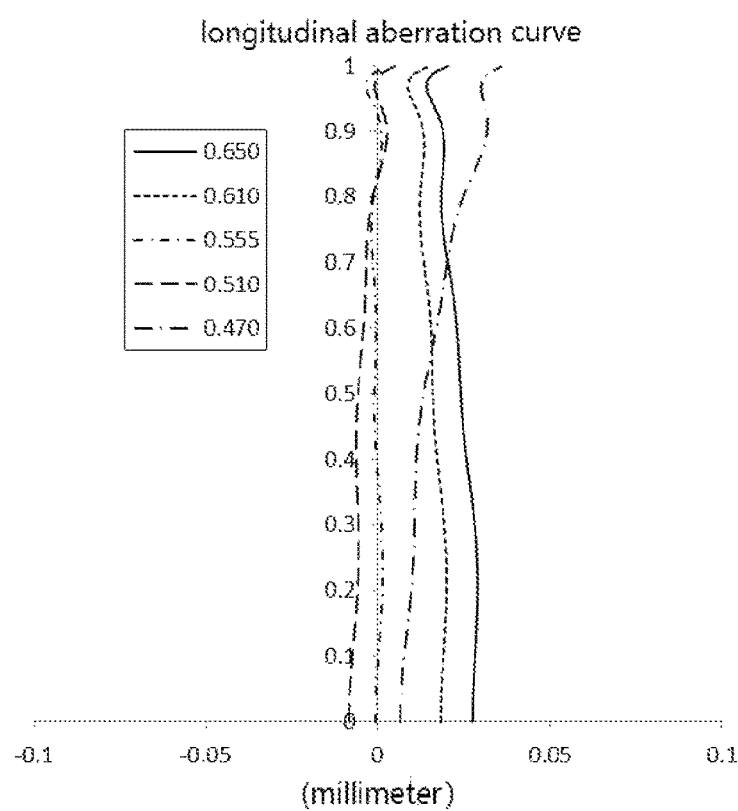
FIG. 4A to FIG. 4D show a longitudinal aberration curve, an astigmatism curve, a distortion curve and a lateral color curve of the zoom lens group of Embodiment 1 is in a wide-angle state, respectively.
Figure 4B:
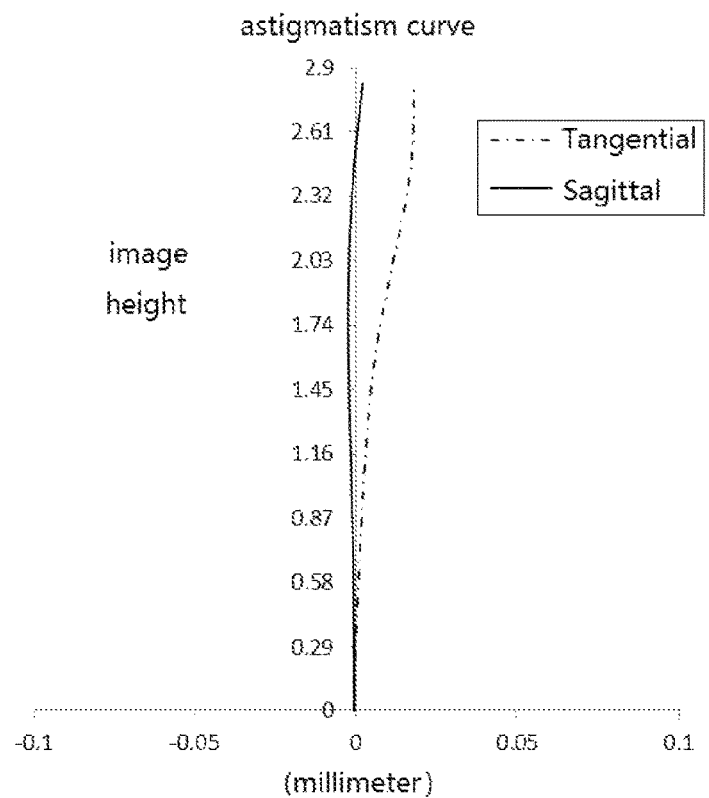
Figure 4C:
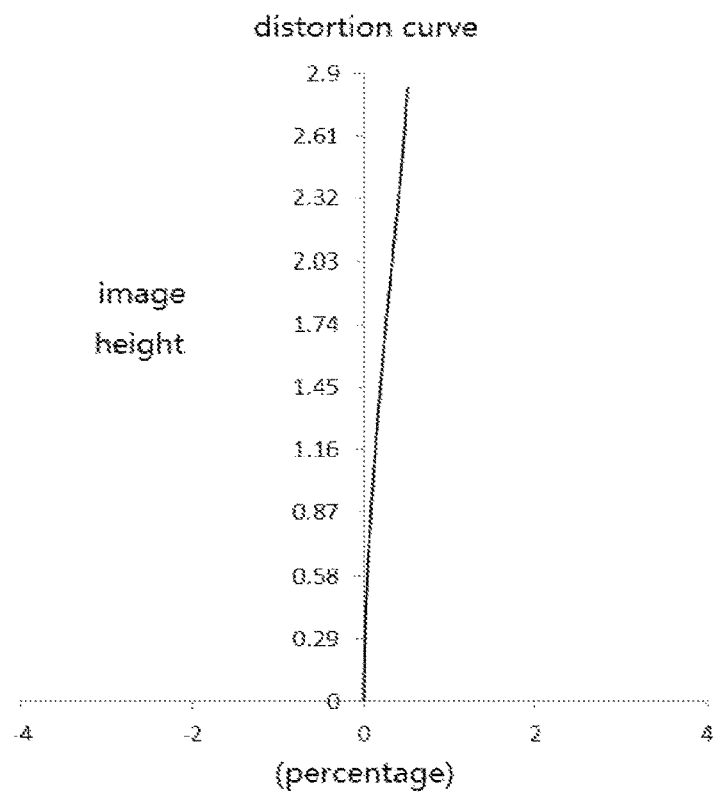
Figure 4D:
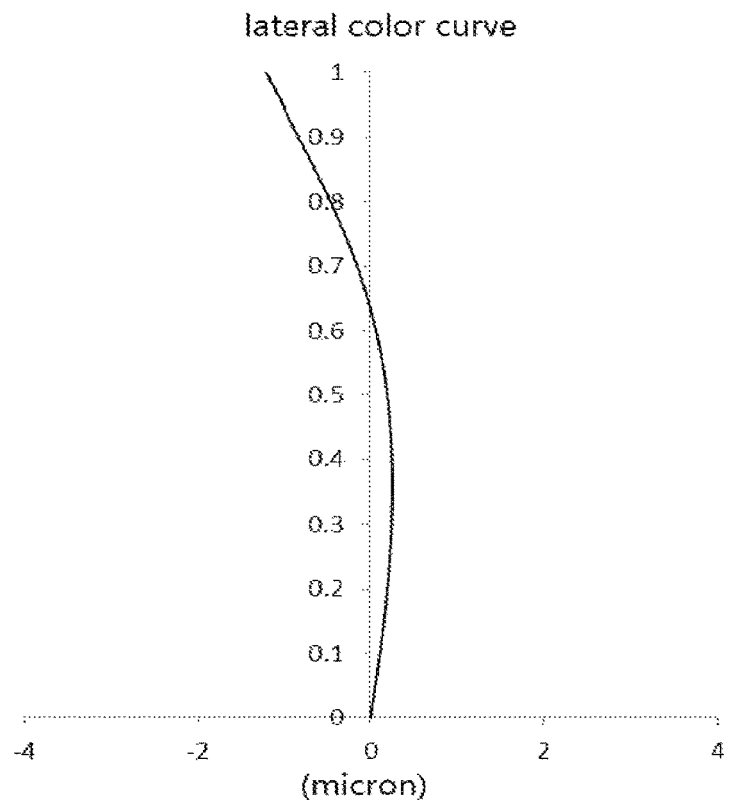
Figure 5A:
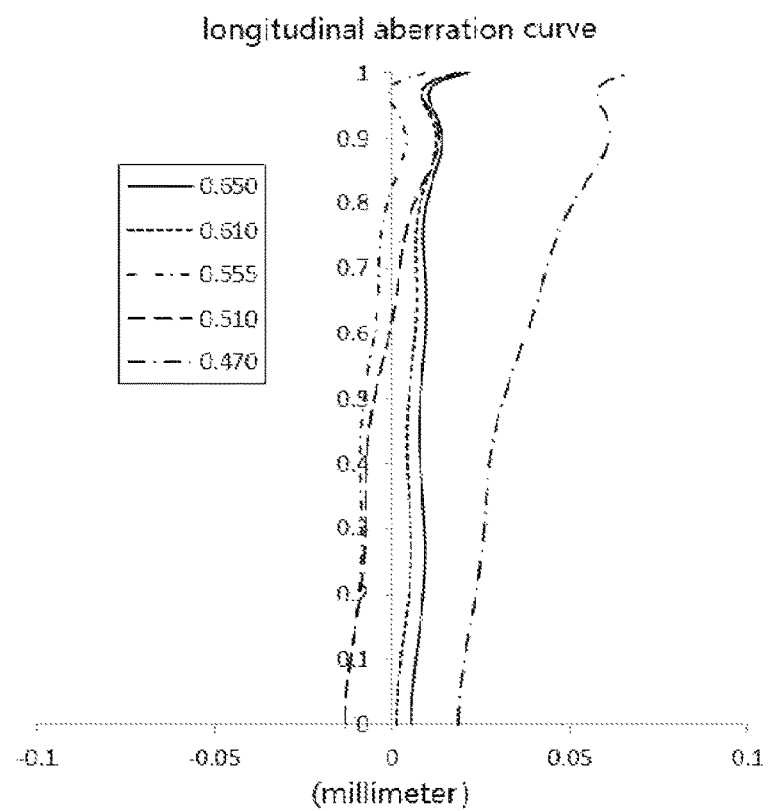
FIG. 5A to FIG. 5D show a longitudinal aberration curve, an astigmatism curve, a distortion curve and a lateral color curve of the zoom lens group of Embodiment 1 is in an intermediate state during switching from a wide-angle state to a long-focus state, respectively.
Figure 5B:
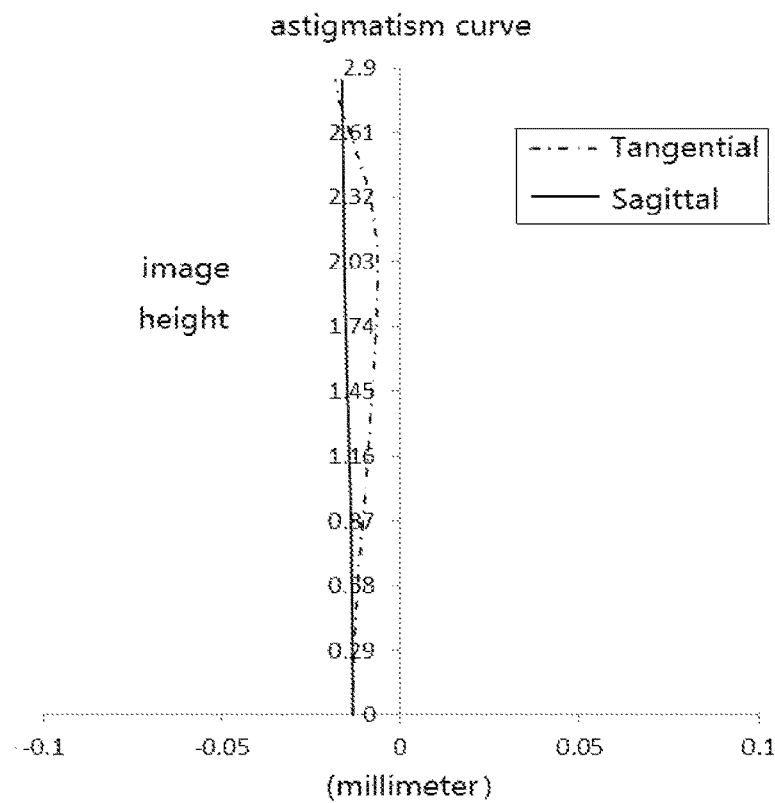
Figure 5C:
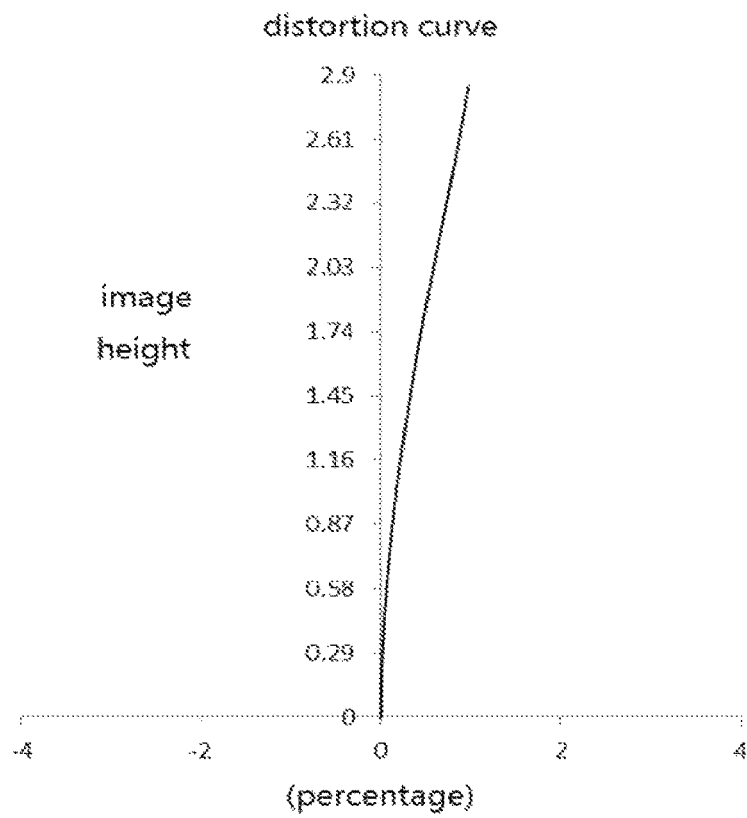
Figure 5D:
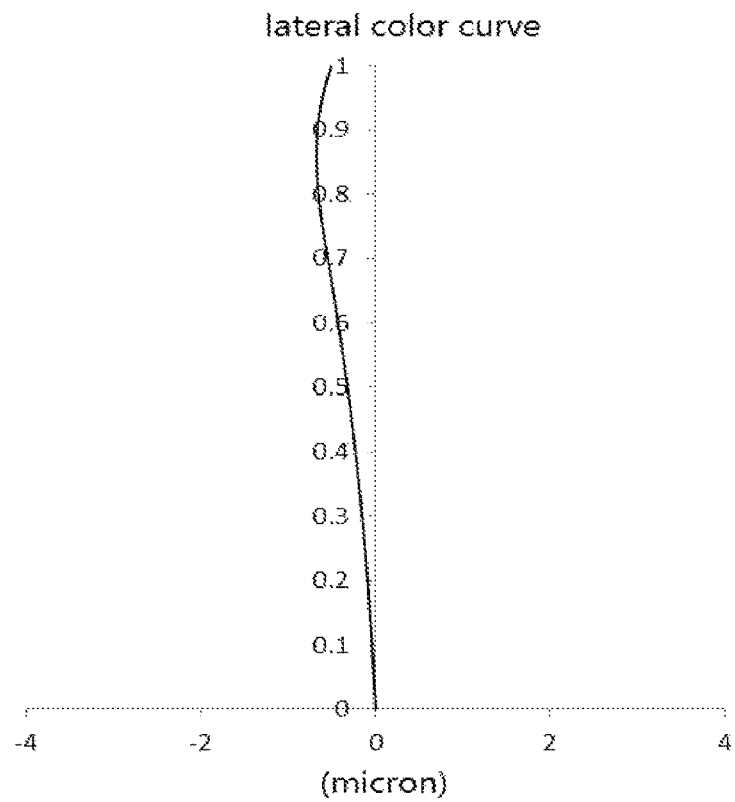
Figure 6A:
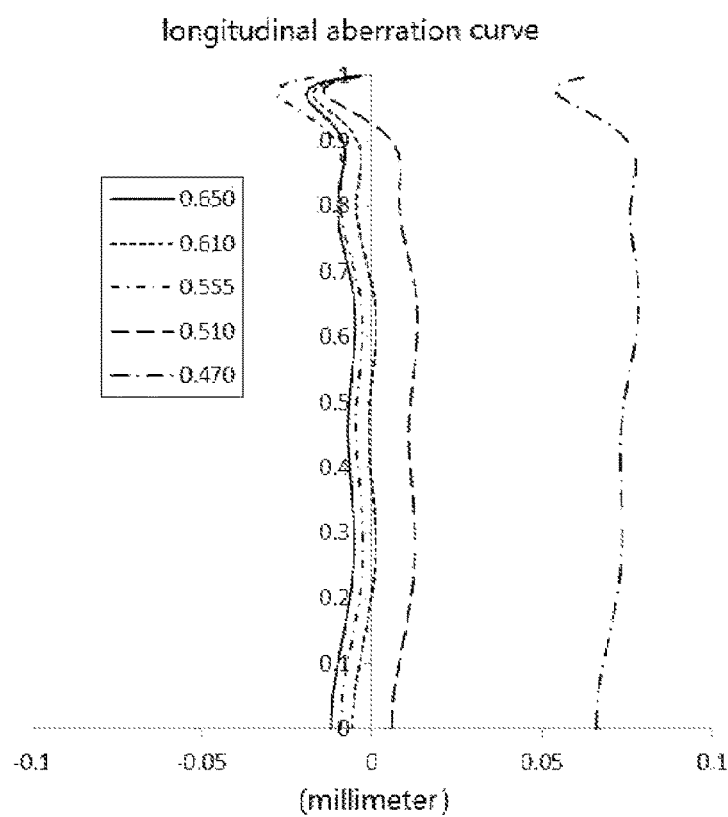
FIG. 6A to FIG. 6D show a longitudinal aberration curve, an astigmatism curve, a distortion curve and a lateral color curve of the zoom lens group of Embodiment 1 is in a long-focus state, respectively.
Figure 6B:
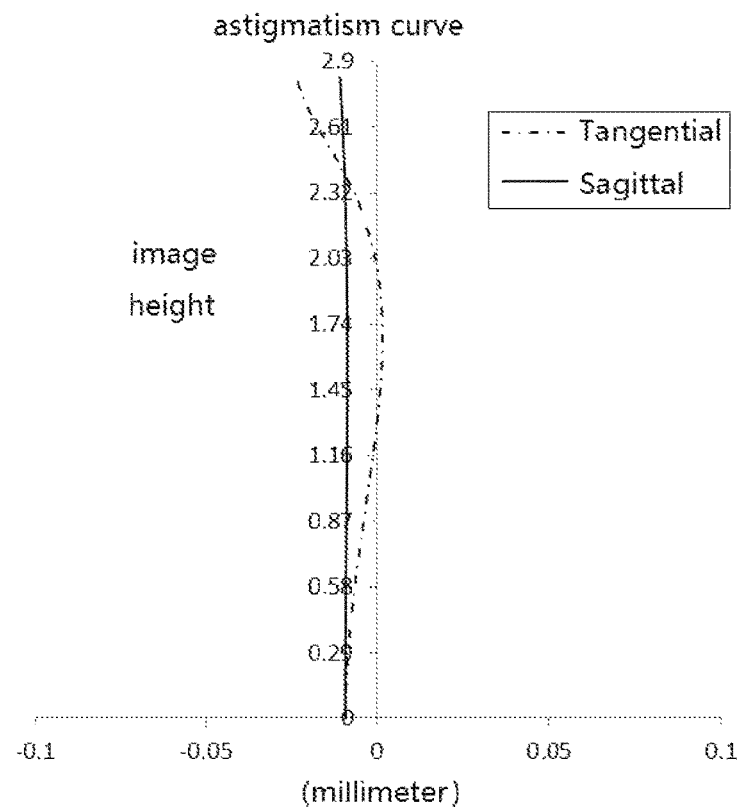
Figure 6C:
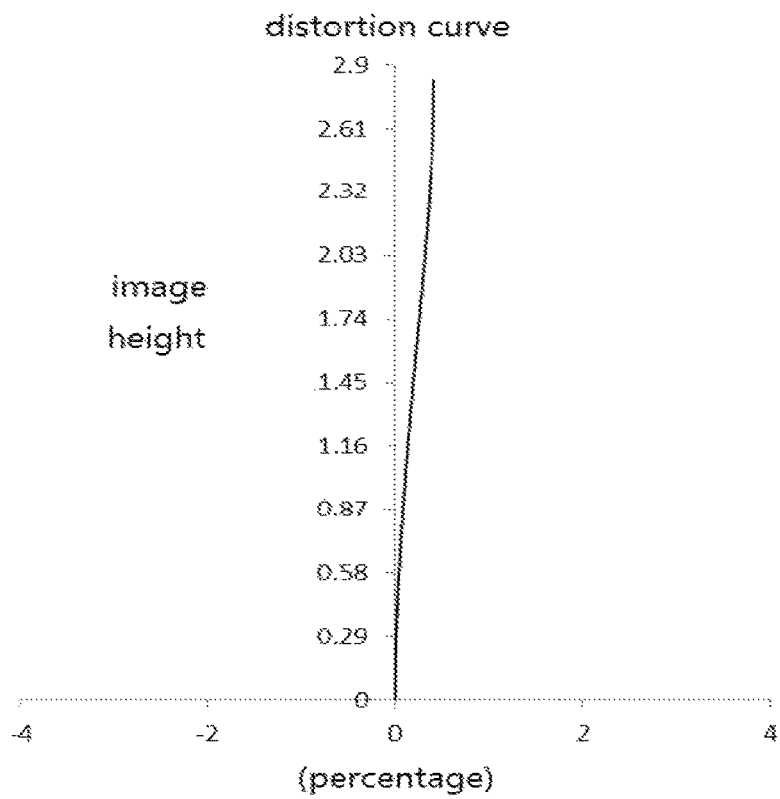
Figure 6D:
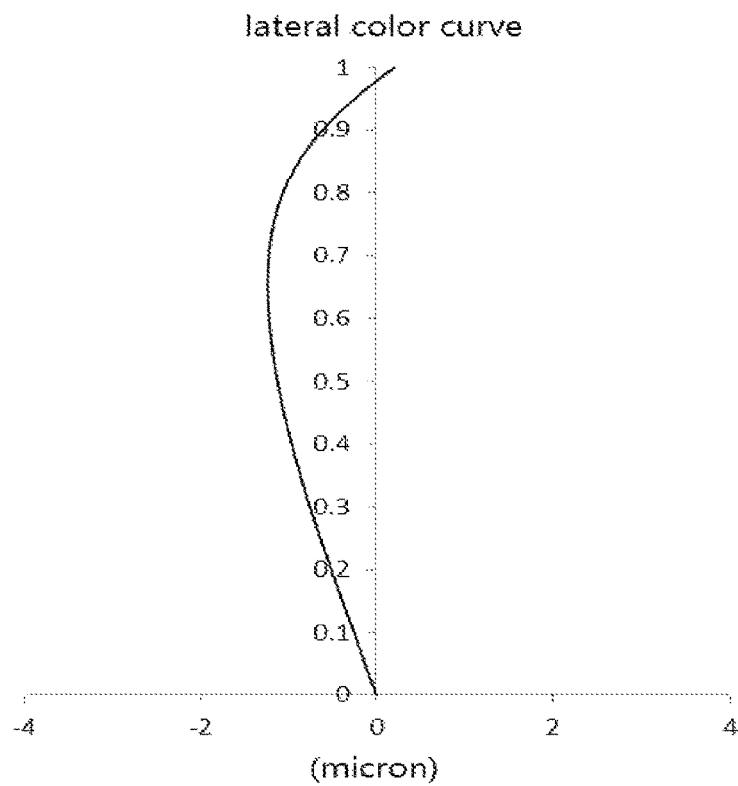

FIG. 4A, FIG. 5A and FIG. 6A show a longitudinal aberration curve when the zoom lens group of Embodiment 1 is in a wide-angle state, an intermediate state and a long-focus state, respectively, and represent convergence focus deviation of light rays of different wavelengths after passing through the lens. FIG. 4B, FIG. 5B and FIG. 6B show an astigmatism curve when the zoom lens group of Embodiment 1 is in a wide-angle state, an intermediate state and a long-focus state, respectively, and represent a meridian image surface curvature and a sagittal image surface curvature. FIG. 4C, FIG. 5C and FIG. 6C show a distortion curve when the zoom lens group of Embodiment 1 is in a wide-angle state, an intermediate state and a long-focus state, respectively, and represent distortion values corresponding to different image heights. FIG. 4D, FIG. 5D and FIG. 6D show a lateral color curve of the zoom lens group of Embodiment 1 is in a wide-angle state, an intermediate state and a long-focus state, and represent deviation of light at different image heights on the imaging surface after the light passes through the lens. According to FIG. 4A to FIG. 6D, it can be determined that the zoom lens group provided in Embodiment 1 can achieve a good imaging quality in various states.

Embodiment 2

Figure 7:
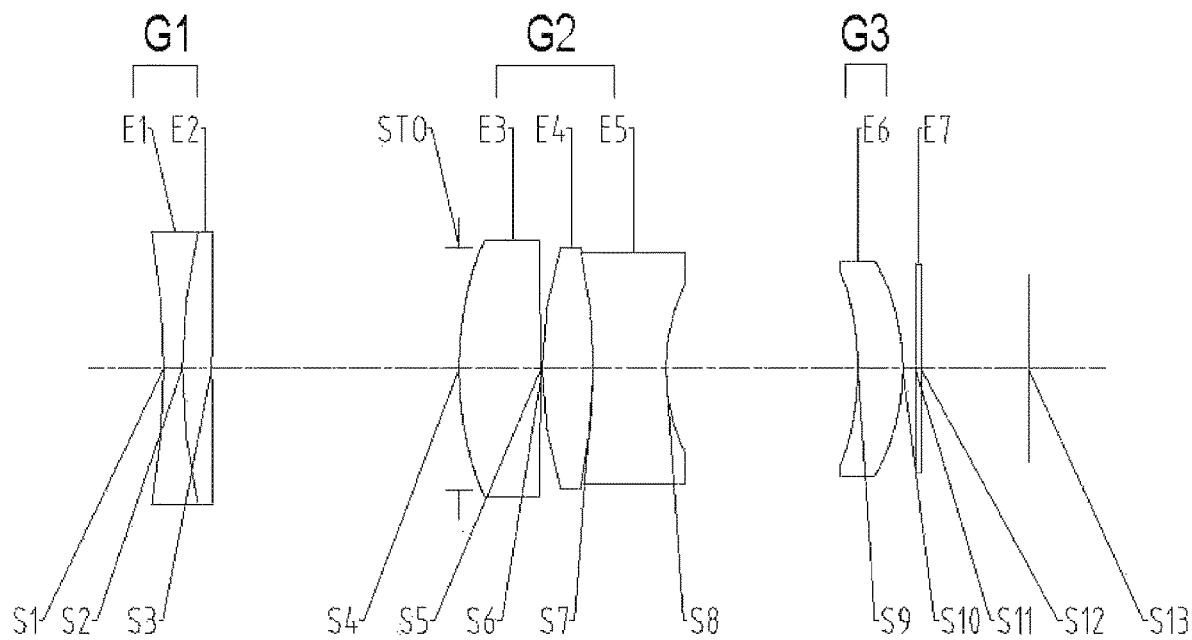
FIG. 7 shows a schematic structure diagram of a zoom lens group according to Embodiment 2 of the disclosure in a wide-angle state.
Figure 8:
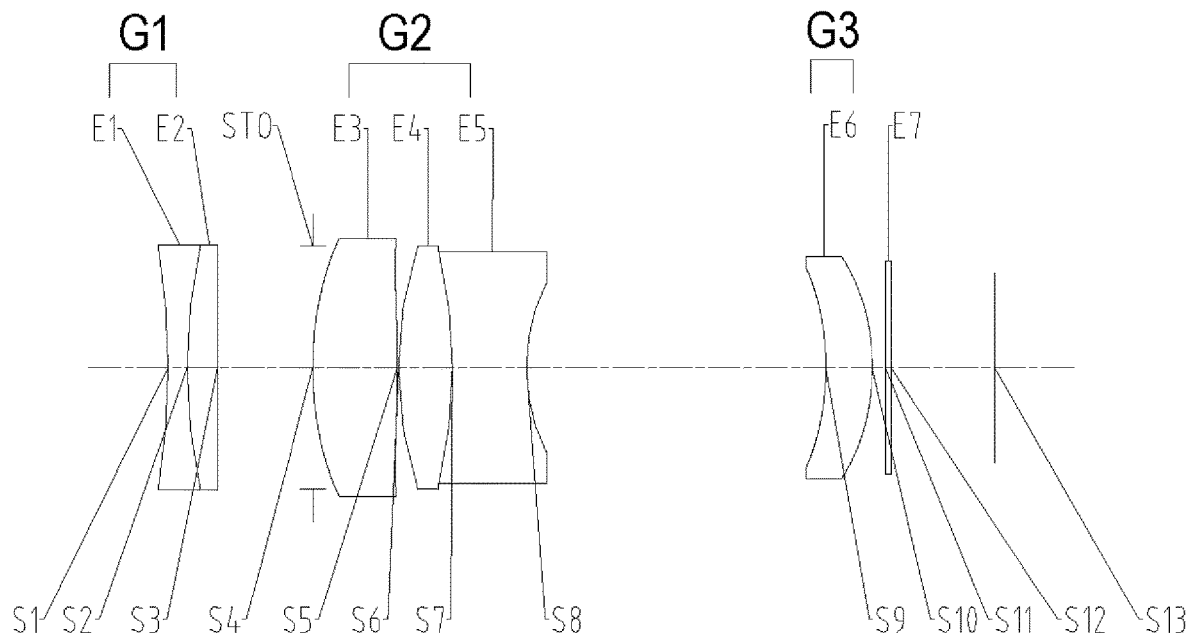
FIG. 8 shows a schematic structure diagram of the zoom lens group according to Embodiment 2 of the disclosure in an intermediate state during switching from a wide-angle state to a long-focus state.
Figure 9:
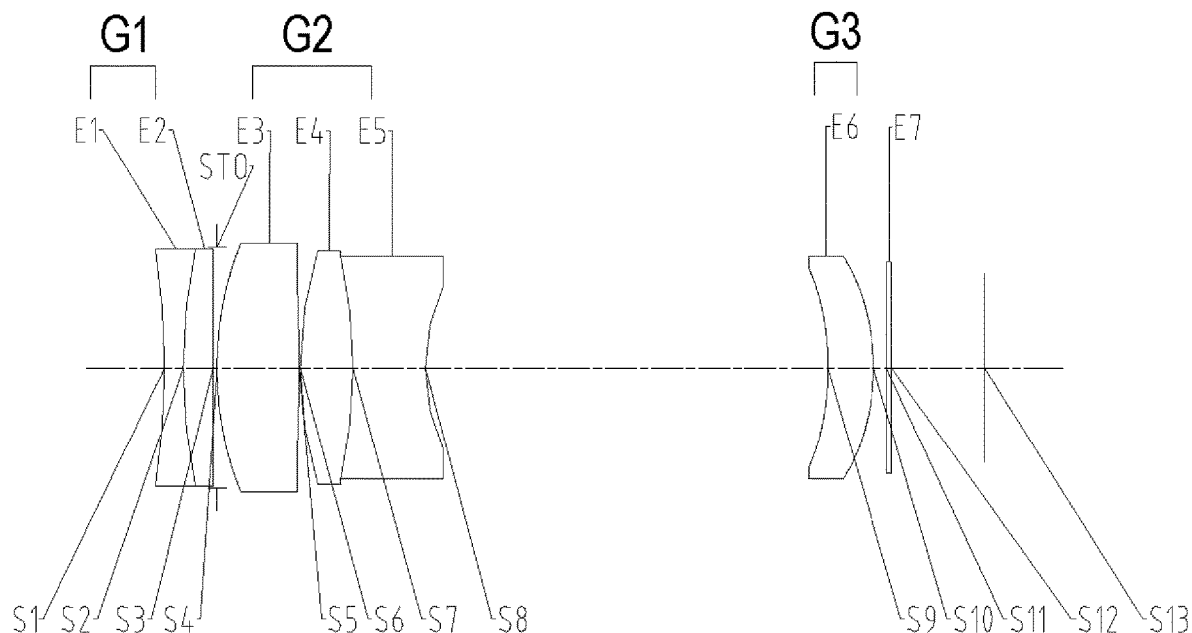
FIG. 9 shows a schematic structure diagram of the zoom lens group according to Embodiment 2 of the disclosure in a long-focus state.

A zoom lens group according to Embodiment 2 of the disclosure will be described below with reference to FIG. 7 to FIG. 12D. In the embodiment and the following embodiments, for brevity, some description similar to Embodiment 1 is omitted. FIG. 7 shows a schematic structure diagram of a zoom lens group according to Embodiment 2 of the disclosure in a wide-angle state. FIG. 8 shows a schematic structure diagram of the zoom lens group according to Embodiment 2 of the disclosure in an intermediate state during switching from a wide-angle state to a long-focus state. FIG. 9 shows a schematic structure diagram of the zoom lens group according to Embodiment 2 of the disclosure in a long-focus state.

As shown in FIG. 7 to FIG. 9, the zoom lens group sequentially includes from an object side to an image side: a first lens group G1 (a first lens E1 and a second lens E2), a diaphragm STO, a second lens group G2 (a third lens E3, a fourth lens E4 and a fifth lens E5), a third lens group G3 (a sixth lens E6), an optical filter E7 and an imaging surface S13.

An object-side surface S1 of the first lens E1 is a concave surface, and an image-side surface S2 thereof is a concave surface. An object-side surface S2 of the second lens E2 is a convex surface, and an image-side surface S3 thereof is a concave surface. An object-side surface S4 of the third lens E3 is a convex surface, and an image-side surface S5 thereof is a convex surface. An object-side surface S6 of the fourth lens E4 is a convex surface, and an image-side surface S7 thereof is a convex surface. An object-side surface S7 of the fifth lens E5 is a concave surface, and an image-side surface S8 thereof is a concave surface. An object-side surface S9 of the sixth lens E6 is a concave surface, and an image-side surface S10 thereof is a convex surface. The optical filter E7 has an object-side surface S11 and an image-side surface S12. Light from an object sequentially passes through the surfaces S1 to S12 and is finally imaged on the imaging surface S13.

Table 4 shows basic parameters of the zoom lens group of Embodiment 2, wherein the units of curvature radius and thickness/distance are millimeter (mm).

TABLE 4

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Spherical | −18.4876 | 0.7291 | 1.81 | 35.0 | |
| S2 | Spherical | 13.9031 | 1.1473 | 1.93 | 20.9 | |
| S3 | Spherical | 343.5992 | D3 | | | |
| STO | Spherical | Infinite | 0.0000 | | | |
| S4 | Aspherical | 8.4559 | 3.1887 | 1.55 | 56.1 | 0.0000 |
| S5 | Aspherical | −34.3879 | 0.0500 | | | 0.0000 |
| S6 | Spherical | 9.5621 | 2.0266 | 1.78 | 49.6 | |
| S7 | Spherical | −12.1397 | 2.8041 | 1.73 | 28.3 | |
| S8 | Spherical | 4.7102 | D9 | | | |
| S9 | Aspherical | −7.0819 | 1.7716 | 1.67 | 20.4 | 0.0000 |
| S10 | Aspherical | −5.2599 | 0.5000 | | | 0.0000 |
| S11 | Spherical | Infinite | 0.2100 | 1.52 | 64.2 | |
| S12 | Spherical | Infinite | D13 | | | |
| S13 | Spherical | Infinite | | | | |

In the embodiment, by changing a separation distance D3 between the first lens group and the second lens group on the optical axis, a separation distance D9 between the second lens group and the third lens group on the optical axis, and a distance D13 between an image-side surface of the optical filter and the imaging surface of the zoom lens group on the optical axis, the zoom lens group is switched from a wide-angle state to a long-focus state or from a long-focus state to a wide-angle state. A total effective focal length f, an aperture value Fno and a maximum field of view (FOV) of the zoom lens group, a total length TTL of the zoom lens group, and a half of the length of the diagonal length of an effective pixel region on the imaging surface S13 of the zoom lens group change along with the zoom lens group switching from a wide-angle state to a long-focus state or from a long-focus state to a wide-angle state.

Table 5 is a table of parameters changing along with different states of the zoom lens group of Embodiment 2, wherein the units of f, TTL, ImgH, D3, D9 and D13 are all millimeter (mm), and the unit of FOV is degree (°).

TABLE 5

| Parameter | Wide-angle state | Intermediate state | Long-focus state |
|---|---|---|---|
| f | 15.01 | 22.01 | 30.01 |
| Fno | 2.90 | 3.54 | 4.43 |
| FOV | 21.3 | 14.6 | 10.7 |
| TTL | 33.73 | 31.26 | 31.75 |
| ImgH | 2.83 | 2.85 | 2.84 |
| D3 | 9.66 | 3.61 | 0.16 |
| D9 | 7.47 | 11.31 | 15.57 |
| D13 | 4.18 | 3.91 | 3.59 |

Table 6 shows high-order coefficients which can be used for the aspherical mirror surfaces in Embodiment 2, wherein the aspherical surface types can be defined by formula (1) given in Embodiment 1 above.

TABLE 6

| Surface number | A4 | A6 | A8 | A10 | A12 | A14 | A16 |
|---|---|---|---|---|---|---|---|
| S4 | 6.8082E−05 | 1.6146E−05 | −1.7970E−06 | 2.6327E−07 | −1.7671E−08 | 6.2761E−10 | −8.2338E−12 |
| S5 | 4.8218E−04 | 2.6644E−05 | −3.9847E−06 | 6.9105E−07 | −5.8213E−08 | 2.6234E−09 | −4.5637E−11 |
| S9 | −7.5311E−04 | 1.9090E−05 | −5.0575E−06 | −1.3389E−07 | 2.3784E−08 | 0.0000E+00 | 0.0000E+00 |
| S10 | 2.2033E−04 | 2.3442E−05 | −3.0065E−06 | 1.3837E−08 | 6.3559E−09 | 0.0000E+00 | 0.0000E+00 |

Figure 10A:
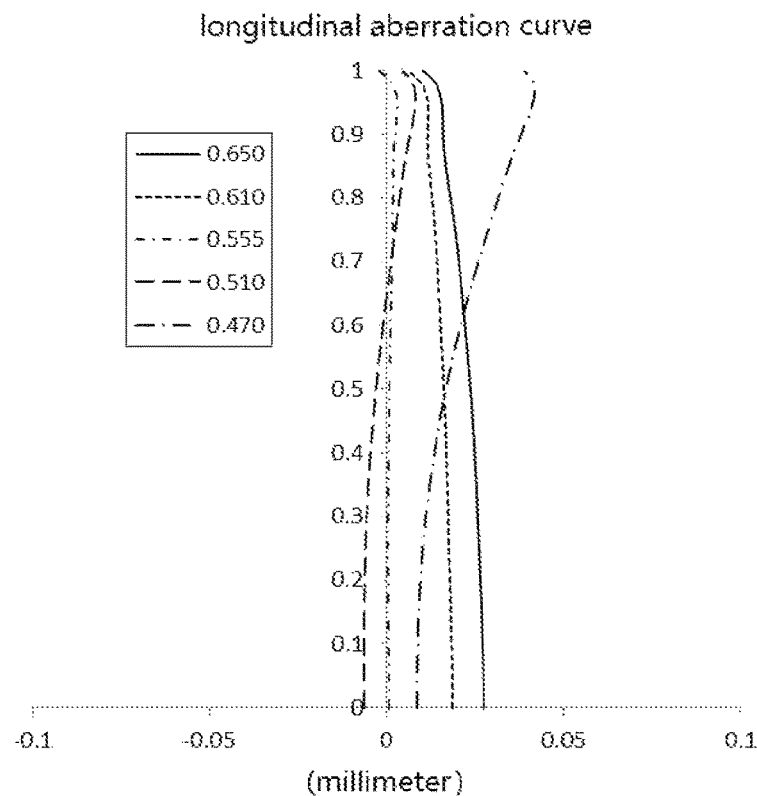
FIG. 10A to FIG. 10D show a longitudinal aberration curve, an astigmatism curve, a distortion curve and a lateral color curve of the zoom lens group of Embodiment 2 is in a wide-angle state, respectively.
Figure 10B:
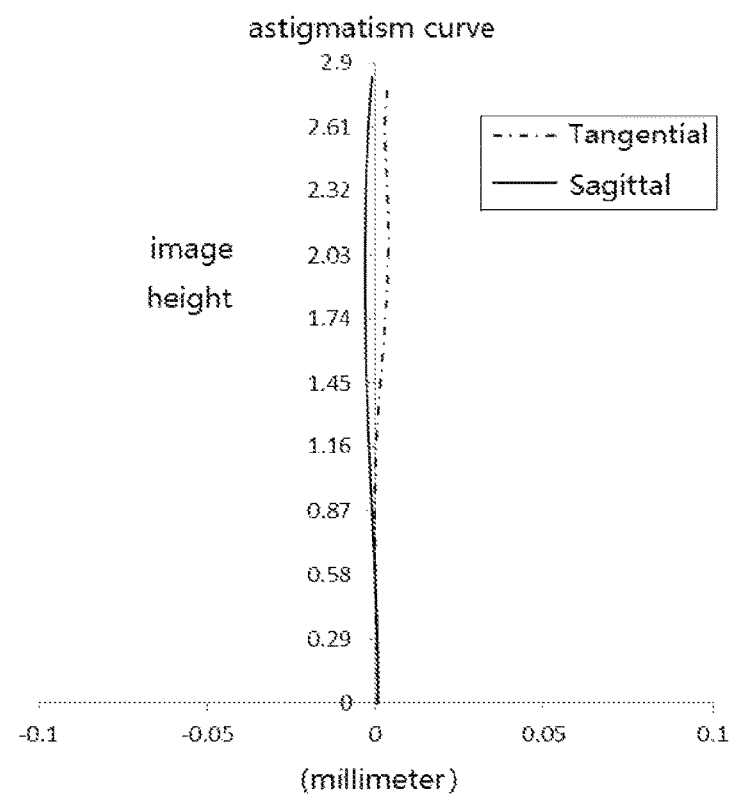
Figure 10C:
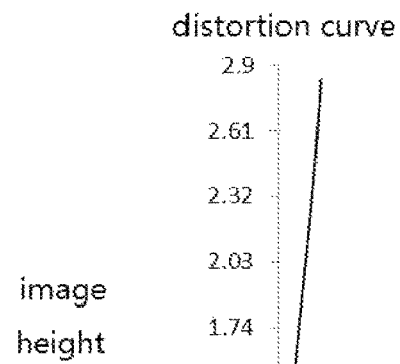
Figure 10D:
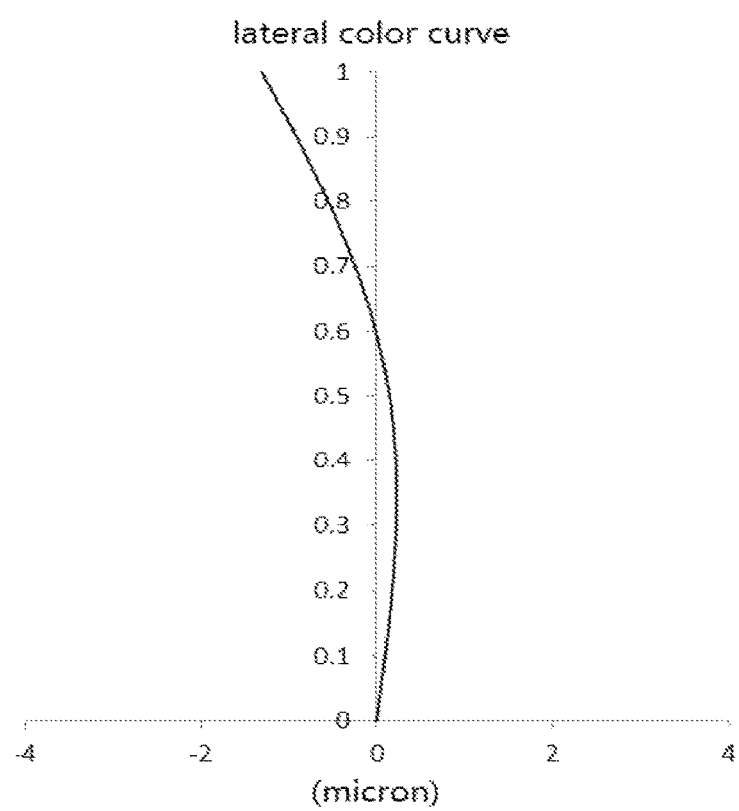
Figure 11A:
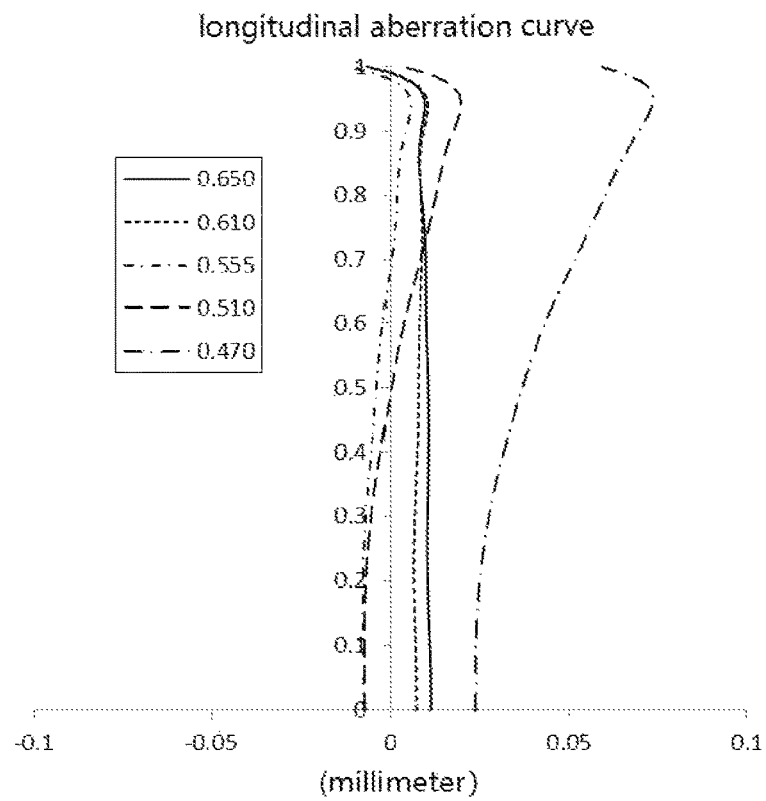
FIG. 11A to FIG. 11D show a longitudinal aberration curve, an astigmatism curve, a distortion curve and a lateral color curve of the zoom lens group of Embodiment 2 is in an intermediate state during switching from a wide-angle state to a long-focus state, respectively.
Figure 11B:
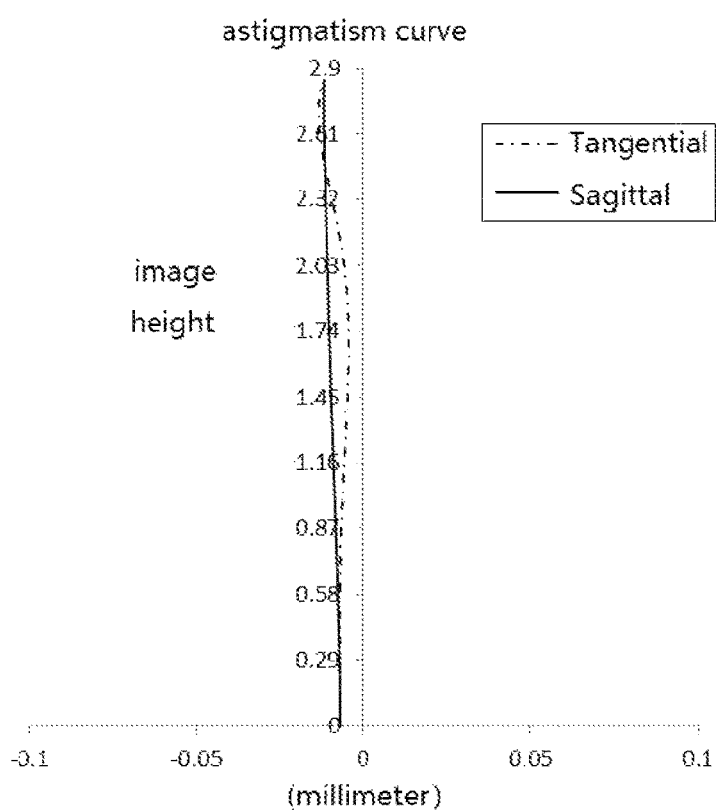
Figure 11C:
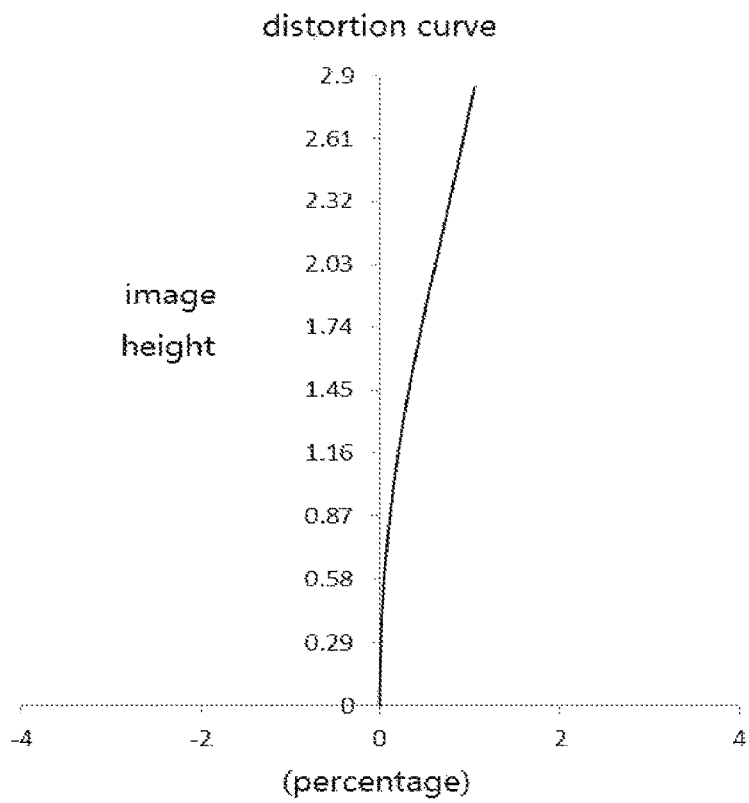
Figure 11D:
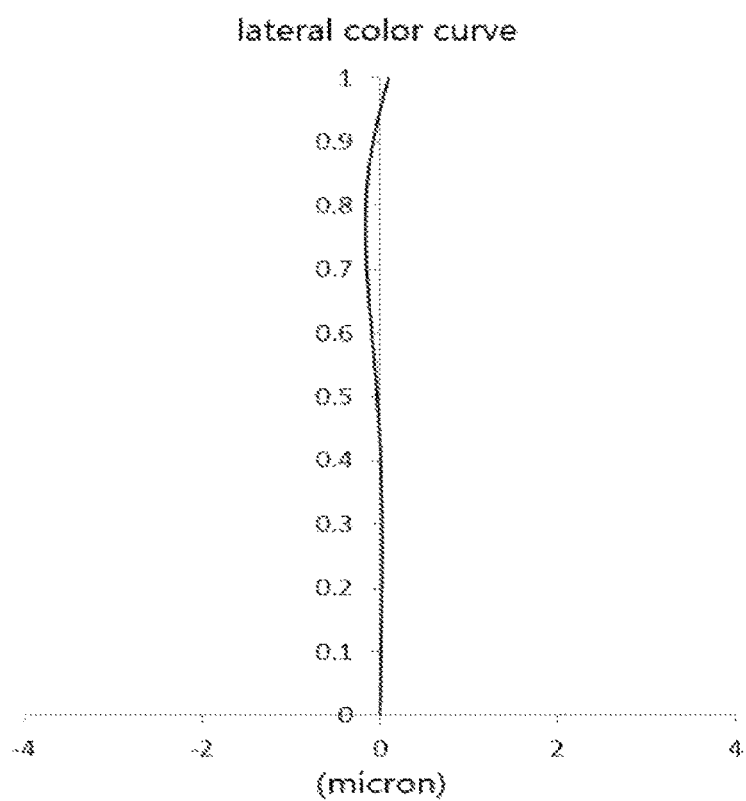
Figure 12A:
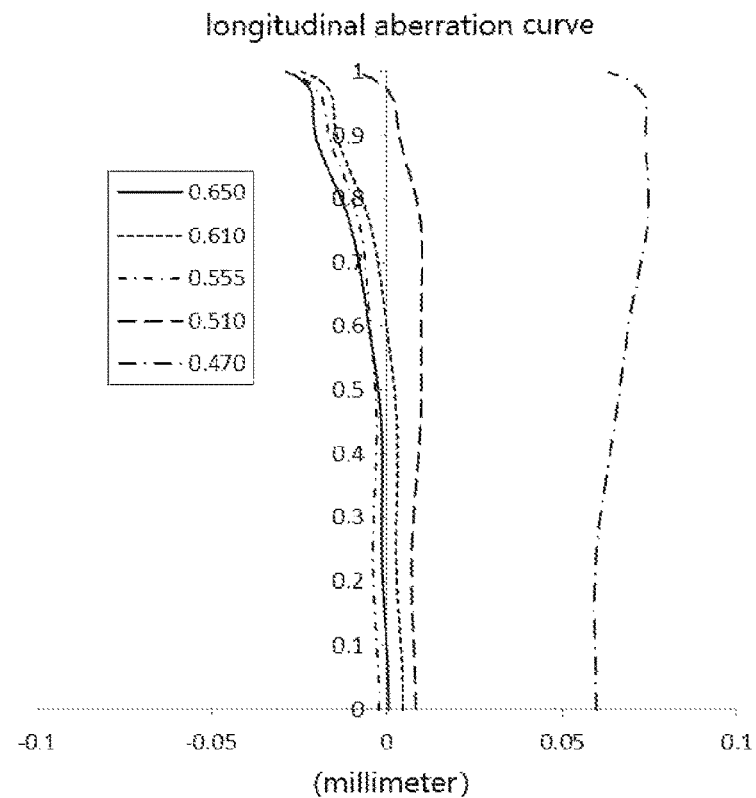
FIG. 12A to FIG. 12D show a longitudinal aberration curve, an astigmatism curve, a distortion curve and a lateral color curve of the zoom lens group of Embodiment 2 is in a long-focus state, respectively.
Figure 12B:
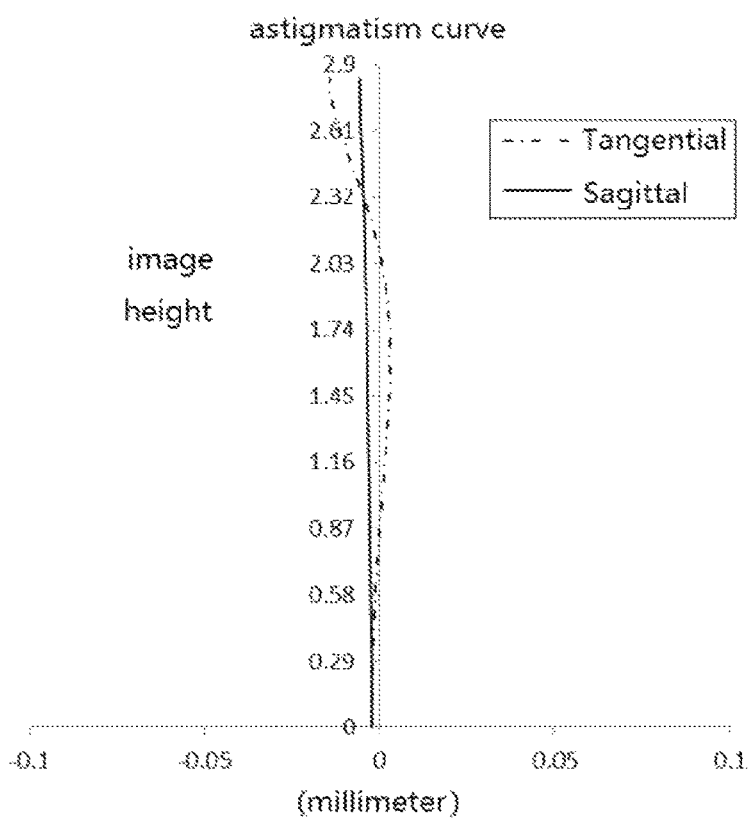
Figure 12C:
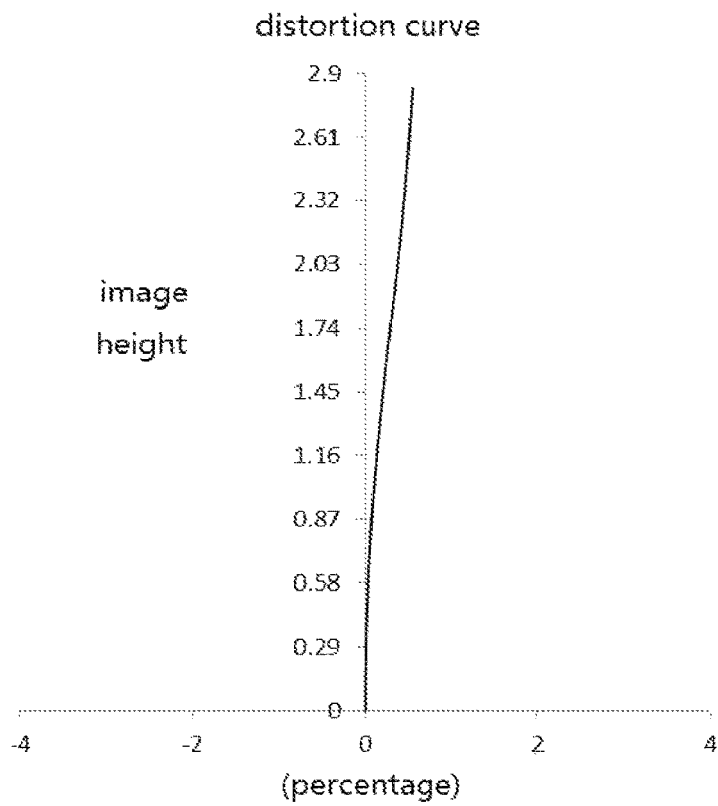
Figure 12D:
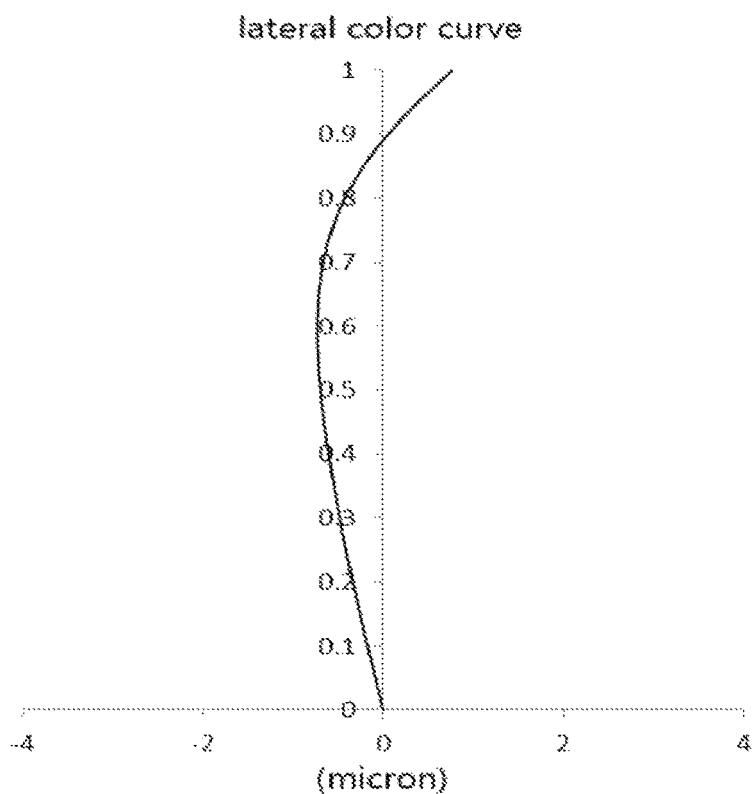

FIG. 10A, FIG. 11A and FIG. 12A show a longitudinal aberration curve when the zoom lens group of Embodiment 2 is in a wide-angle state, an intermediate state and a long-focus state, respectively, and represent convergence focus deviation of light rays of different wavelengths after passing through the lens. FIG. 10B, FIG. 11B and FIG. 12B show an astigmatism curve when the zoom lens group of Embodiment 2 is in a wide-angle state, an intermediate state and a long-focus state, respectively, and represent a meridian image surface curvature and a sagittal image surface curvature. FIG. 10C, FIG. 11C and FIG. 12C show a distortion curve when the zoom lens group of Embodiment 2 is in a wide-angle state, an intermediate state and a long-focus state, respectively, and represent distortion values corresponding to different image heights. FIG. 10D, FIG. 11D and FIG. 12D show a lateral color curve of the zoom lens group of Embodiment 2 is in a wide-angle state, an intermediate state and a long-focus state, and represent deviation of light at different image heights on the imaging surface after the light passes through the lens. According to FIG. 10A to FIG. 12D, it can be determined that the zoom lens group provided in Embodiment 2 can achieve a good imaging quality in various states.

Embodiment 3

Figure 13:
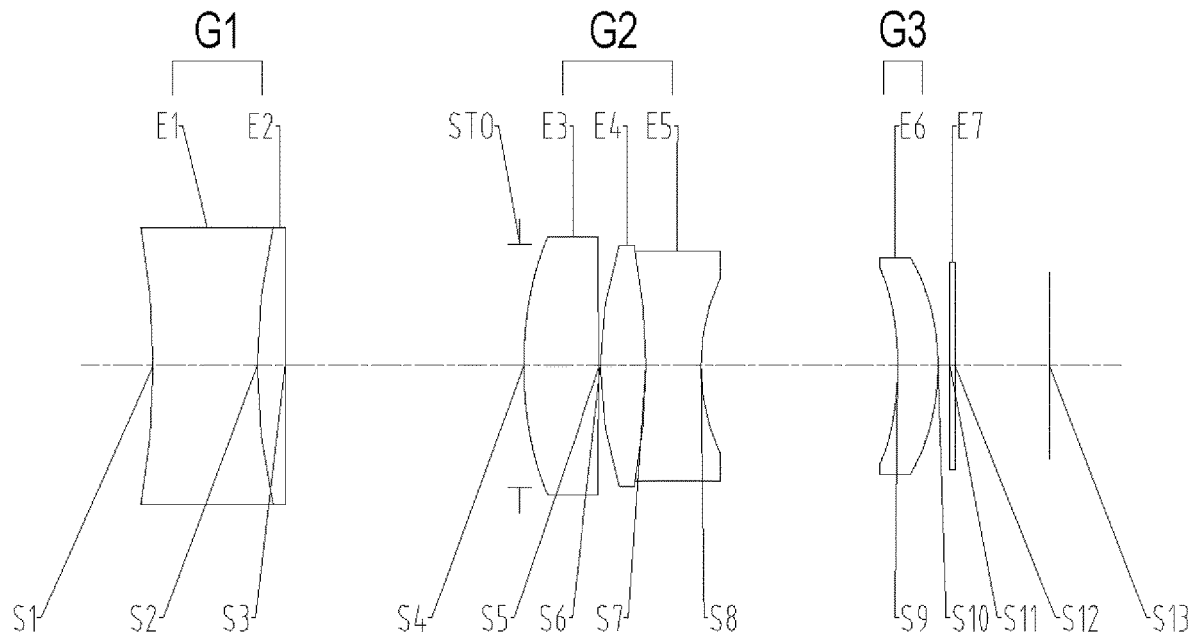
FIG. 13 shows a schematic structure diagram of a zoom lens group according to Embodiment 3 of the disclosure in a wide-angle state.
Figure 14:
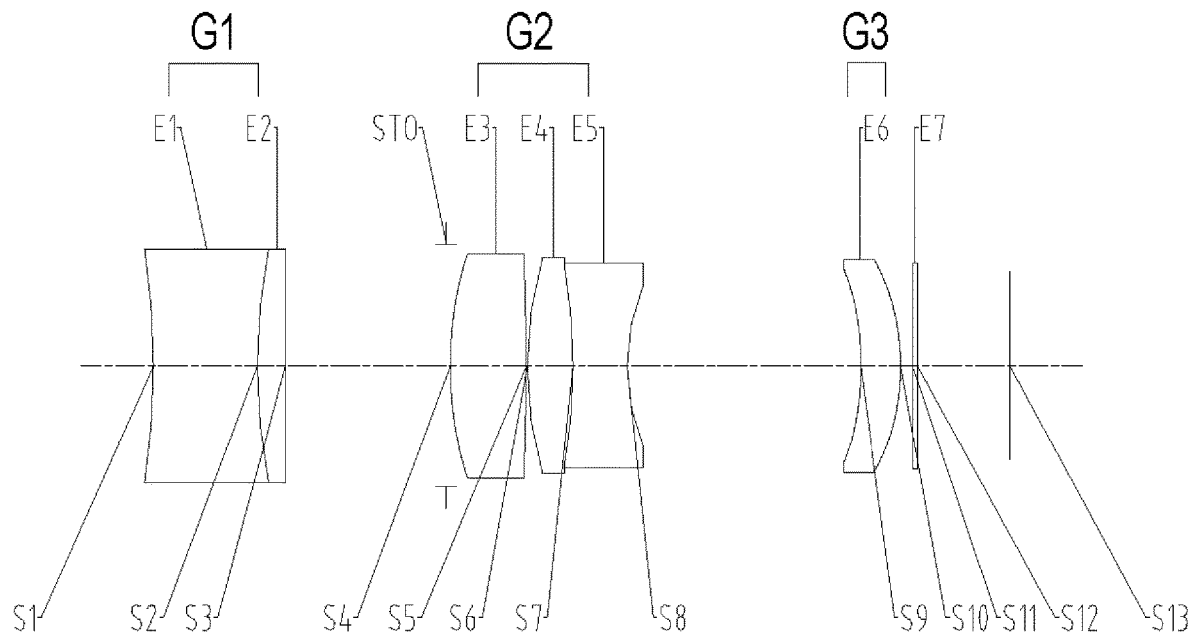
FIG. 14 shows a schematic structure diagram of the zoom lens group according to Embodiment 3 of the disclosure in an intermediate state during switching from a wide-angle state to a long-focus state.
Figure 15:
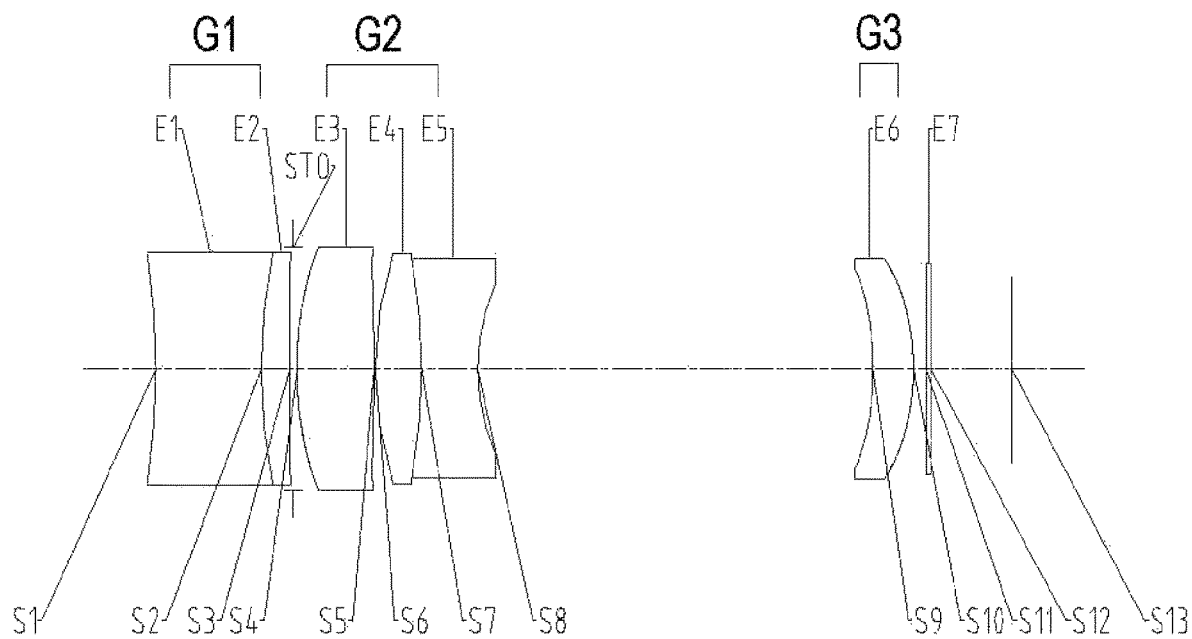
FIG. 15 shows a schematic structure diagram of the zoom lens group according to Embodiment 3 of the disclosure in a long-focus state.

A zoom lens group according to Embodiment 3 of the disclosure will be described below with reference to FIG. 13 to FIG. 18D. FIG. 13 shows a schematic structure diagram of a zoom lens group according to Embodiment 3 of the disclosure in a wide-angle state. FIG. 14 shows a schematic structure diagram of the zoom lens group according to Embodiment 3 of the disclosure in an intermediate state during switching from a wide-angle state to a long-focus state. FIG. 15 shows a schematic structure diagram of the zoom lens group according to Embodiment 3 of the disclosure in a long-focus state.

As shown in FIG. 13 to FIG. 15, the zoom lens group sequentially includes from an object side to an image side: a first lens group G1 (a first lens E1 and a second lens E2), a diaphragm STO, a second lens group G2 (a third lens E3, a fourth lens E4 and a fifth lens E5), a third lens group G3 (a sixth lens E6), an optical filter E7 and an imaging surface S13.

An object-side surface S1 of the first lens E1 is a concave surface, and an image-side surface S2 thereof is a concave surface. An object-side surface S2 of the second lens E2 is a convex surface, and an image-side surface S3 thereof is a concave surface. An object-side surface S4 of the third lens E3 is a convex surface, and an image-side surface S5 thereof is a convex surface. An object-side surface S6 of the fourth lens E4 is a convex surface, and an image-side surface S7 thereof is a convex surface. An object-side surface S7 of the fifth lens E5 is a concave surface, and an image-side surface S8 thereof is a concave surface. An object-side surface S9 of the sixth lens E6 is a concave surface, and an image-side surface S10 thereof is a convex surface. The optical filter E7 has an object-side surface S11 and an image-side surface S12. Light from an object sequentially passes through the surfaces S1 to S12 and is finally imaged on the imaging surface S13.

Table 7 shows basic parameters of the zoom lens group of Embodiment 3, wherein the units of curvature radius and thickness/distance are millimeter (mm).

TABLE 7

| Surface number | Surface type | Curvature radius | Thickness/ distance | Material Refractive index | Material Abbe number | Conic coefficient |
|---|---|---|---|---|---|---|
| OBJ | Spherical | Infinite | Infinite | | | |
| S1 | Spherical | −17.0722 | 4.3385 | 1.80 | 35.8 | |
| S2 | Spherical | 13.2827 | 1.1693 | 1.91 | 21.6 | |
| S3 | Spherical | 274.8385 | D3 | | | |
| STO | Spherical | Infinite | 0.1636 | | | |
| S4 | Aspherical | 8.4586 | 3.1755 | 1.55 | 56.1 | 0.0000 |

TABLE 7-continued

| Surface number | Surface type | Curvature radius | Thickness/ distance | Material Refractive index | Abbe number | Conic coefficient |
|---|---|---|---|---|---|---|
| S5 | Aspherical | −35.6958 | 0.0500 | | | 0.0000 |
| S6 | Spherical | 8.7112 | 1.8940 | 1.78 | 49.6 | |
| S7 | Spherical | −13.3750 | 2.3000 | 1.73 | 28.3 | |
| S8 | Spherical | 4.6922 | D9 | | | |
| S9 | Aspherical | −6.9214 | 1.6825 | 1.65 | 23.5 | 0.0000 |
| S10 | Aspherical | −5.0979 | 0.5000 | | | 0.0000 |
| S11 | Spherical | Infinite | 0.2100 | 1.52 | 64.2 | |
| S12 | Spherical | Infinite | D13 | | | |
| S13 | Spherical | Infinite | | | | |

In the embodiment, by changing a separation distance D3 between the first lens group and the second lens group on the optical axis, a separation distance D9 between the second lens group and the third lens group on the optical axis, and a distance D13 between an image-side surface of the optical filter and the imaging surface of the zoom lens group on the optical axis, the zoom lens group is switched from a wide-angle state to a long-focus state or from a long-focus state to a wide-angle state. A total effective focal length f, an aperture value Fno and a maximum field of view (FOV) of the zoom lens group, a total length TTL of the zoom lens group, and a half of the length of the diagonal length of an effective pixel region on the imaging surface S13 of the zoom lens group change along with the zoom lens group switching from a wide-angle state to a long-focus state or from a long-focus state to a wide-angle state.

Table 8 is a table of parameters changing along with different states of the zoom lens group of Embodiment 3, wherein the units of f, TTL, ImgH, D3, D9 and D13 are all millimeter (mm), and the unit of FOV is degree (°).

TABLE 8

| Parameter | Wide-angle state | Intermediate state | Long-focus state |
|---|---|---|---|
| f | 13.31 | 15.79 | 26.61 |
| Fno | 2.90 | 3.54 | 4.43 |
| FOV | 23.9 | 20.2 | 12.1 |
| TTL | 37.48 | 35.86 | 35.28 |
| ImgH | 2.80 | 2.82 | 2.82 |
| D3 | 9.98 | 6.92 | 0.33 |
| D9 | 8.24 | 9.76 | 16.30 |
| D13 | 3.95 | 3.86 | 3.33 |

Table 9 shows high-order coefficients which can be used for the aspherical mirror surfaces in Embodiment 3, wherein the aspherical surface types can be defined by formula (1) given in Embodiment 1 above.

TABLE 9

| Surface number | A4 | A6 | A8 | A10 | A12 | A14 | A16 |
|---|---|---|---|---|---|---|---|
| S4 | 6.6053E−05 | 2.0015E−05 | −3.1059E−06 | 4.9777E−07 | −4.0701E−08 | 1.7938E−09 | −3.2037E−11 |
| S5 | 4.7356E−04 | 2.9849E−05 | −5.0524E−06 | 8.9135E−07 | −7.9707E−08 | 3.8463E−09 | −7.4248E−11 |
| S9 | −7.4764E−04 | −3.2847E−05 | 7.7670E−06 | −1.6708E−06 | 8.3793E−08 | 0.0000E+00 | 0.0000E+00 |
| S10 | 3.1863E−04 | −1.6601E−05 | 4.8680E−06 | −7.1088E−07 | 2.9379E−08 | 0.0000E+00 | 0.0000E+00 |

Figure 16A:
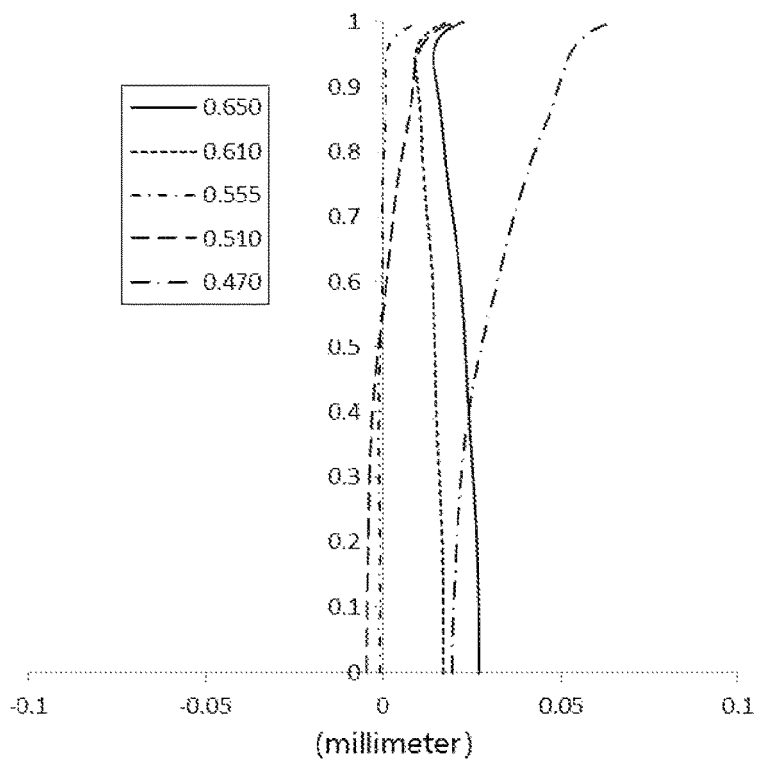
FIG. 16A to FIG. 16D show a longitudinal aberration curve, an astigmatism curve, a distortion curve and a lateral color curve of the zoom lens group of Embodiment 3 is in a wide-angle state, respectively.
Figure 16B:
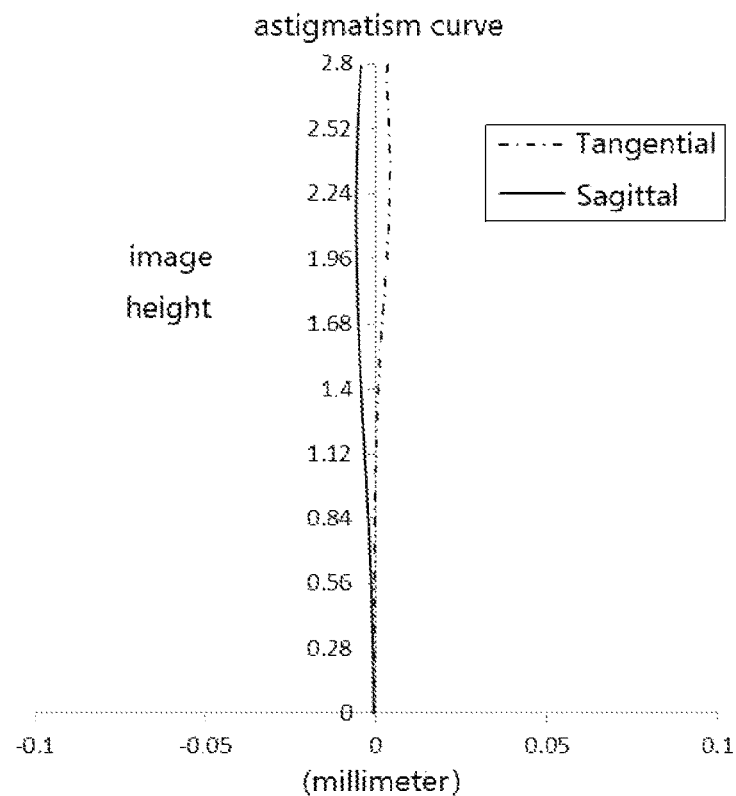
Figure 16C:
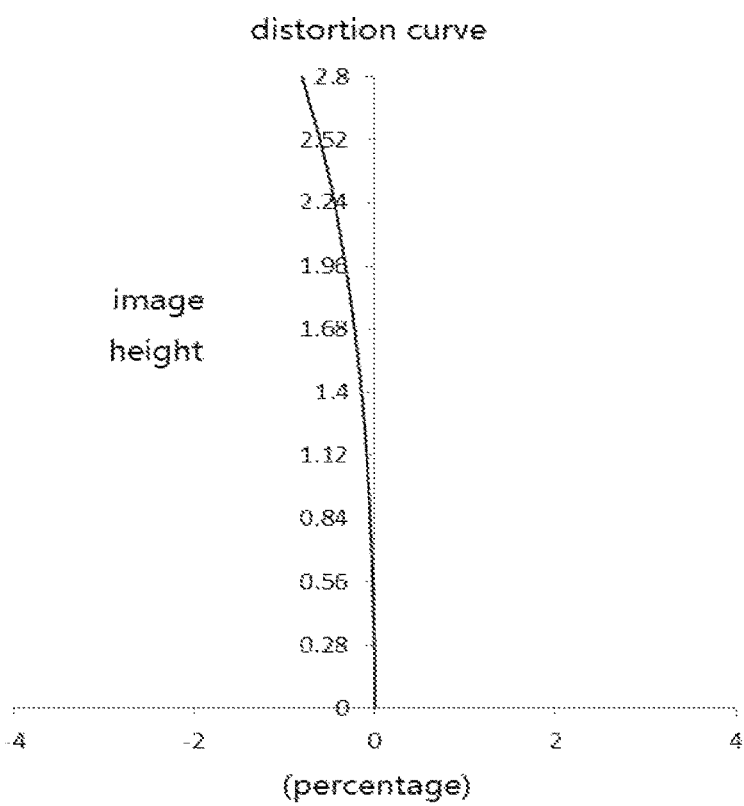
Figure 16D:
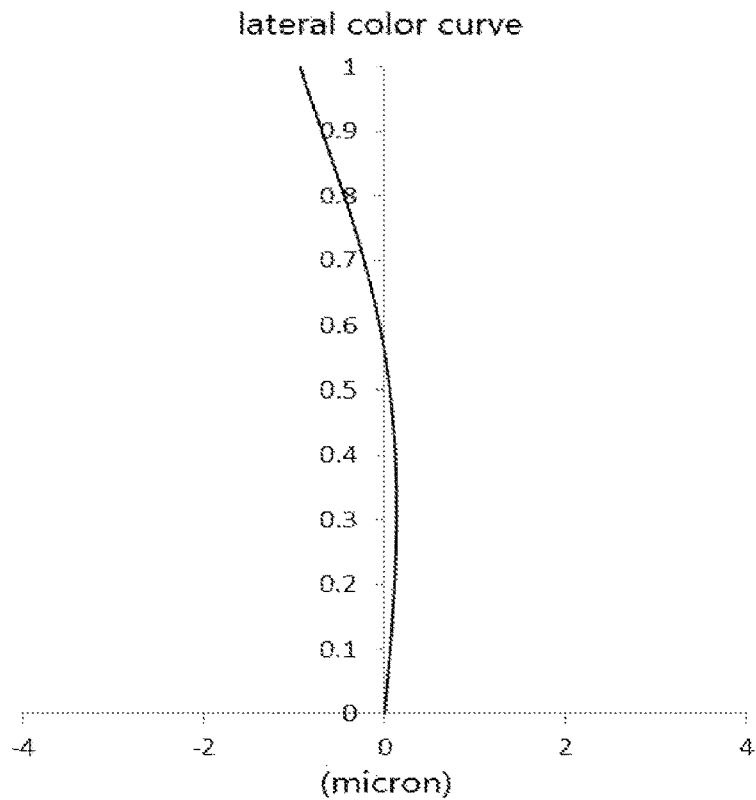
Figure 17A:
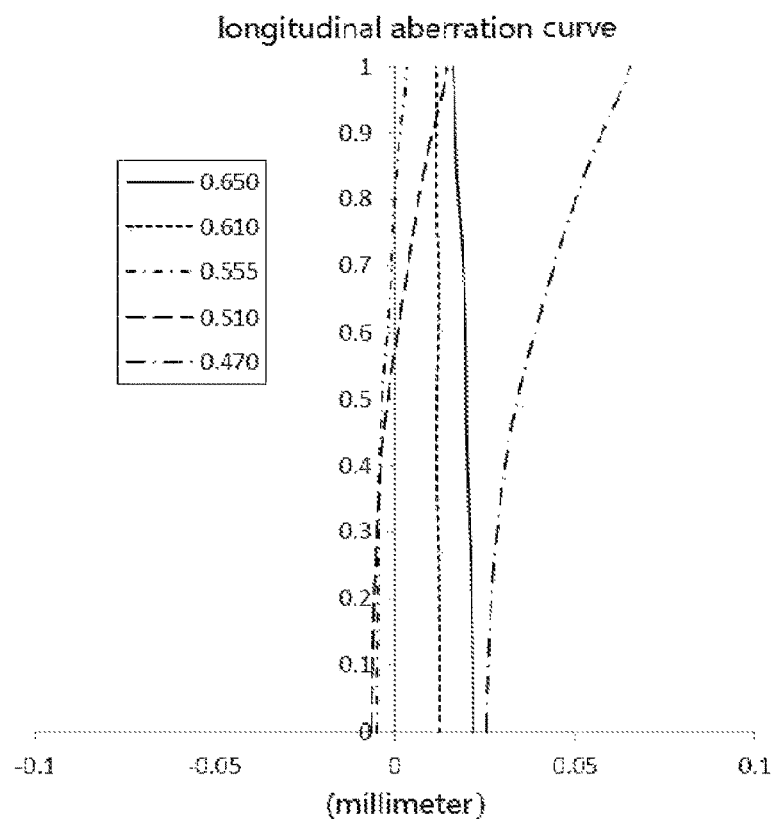
FIG. 17A to FIG. 17D show a longitudinal aberration curve, an astigmatism curve, a distortion curve and a lateral color curve of the zoom lens group of Embodiment 3 is in an intermediate state during switching from a wide-angle state to a long-focus state, respectively.
Figure 17B:
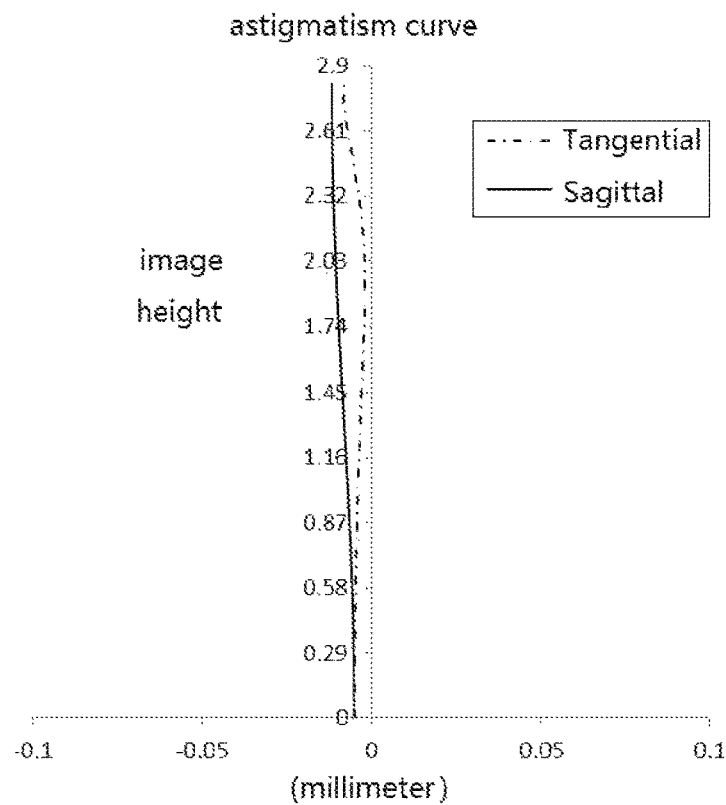
Figure 17C:
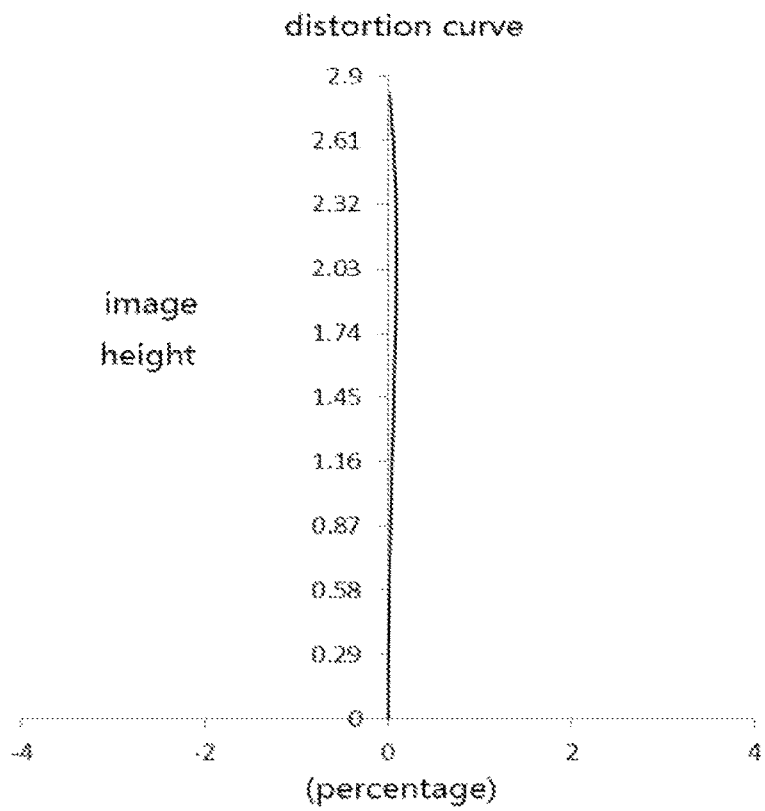
Figure 17D:
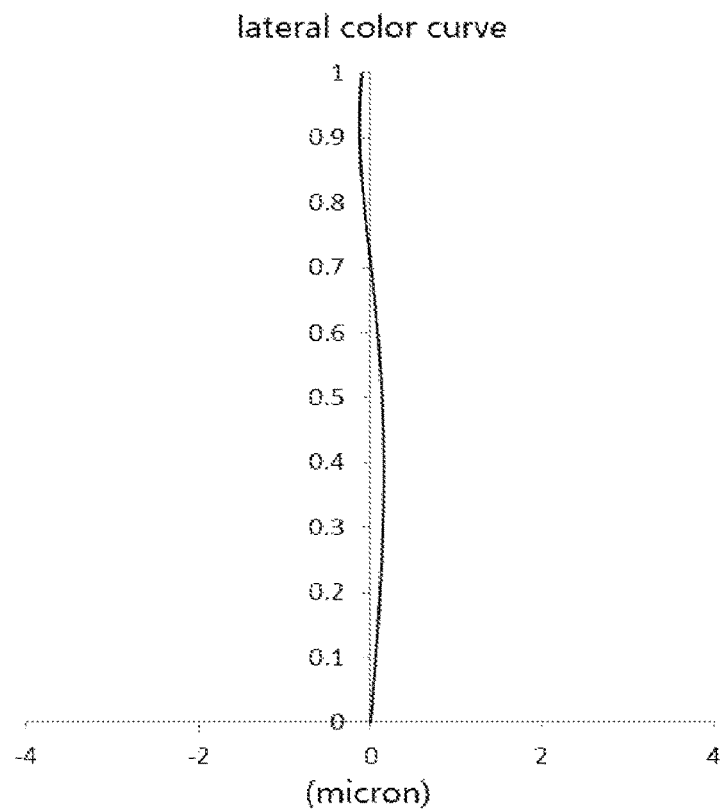
Figure 18A:
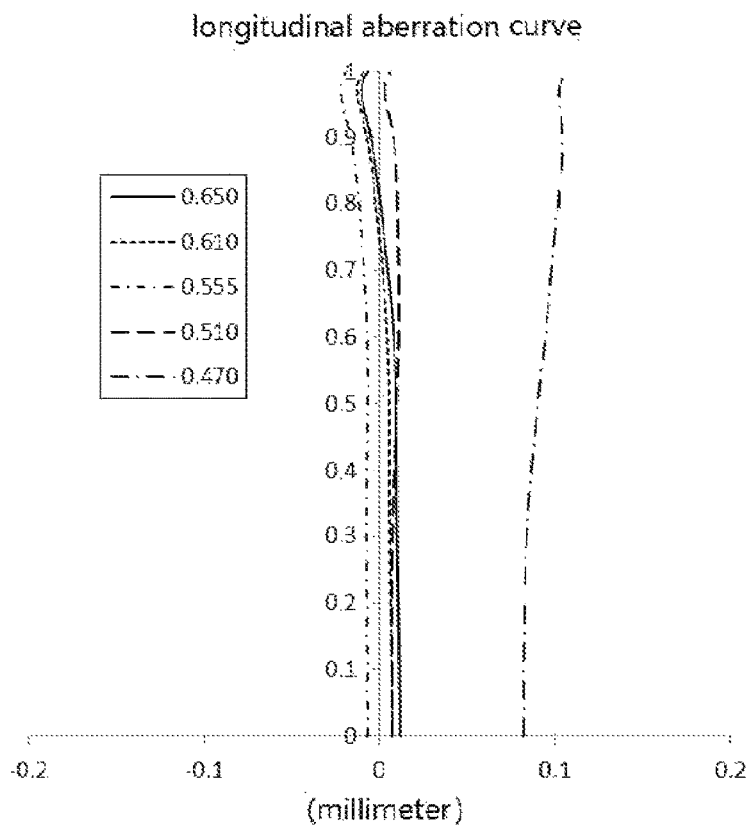
FIG. 18A to FIG. 18D show a longitudinal aberration curve, an astigmatism curve, a distortion curve and a lateral color curve of the zoom lens group of Embodiment 3 is in a long-focus state, respectively.
Figure 18B:
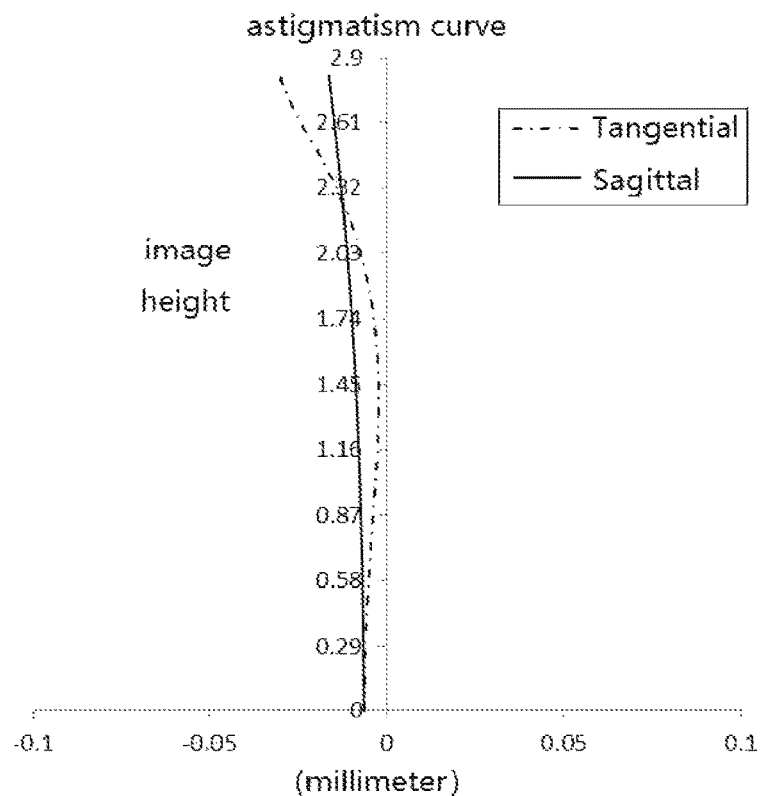
Figure 18C:
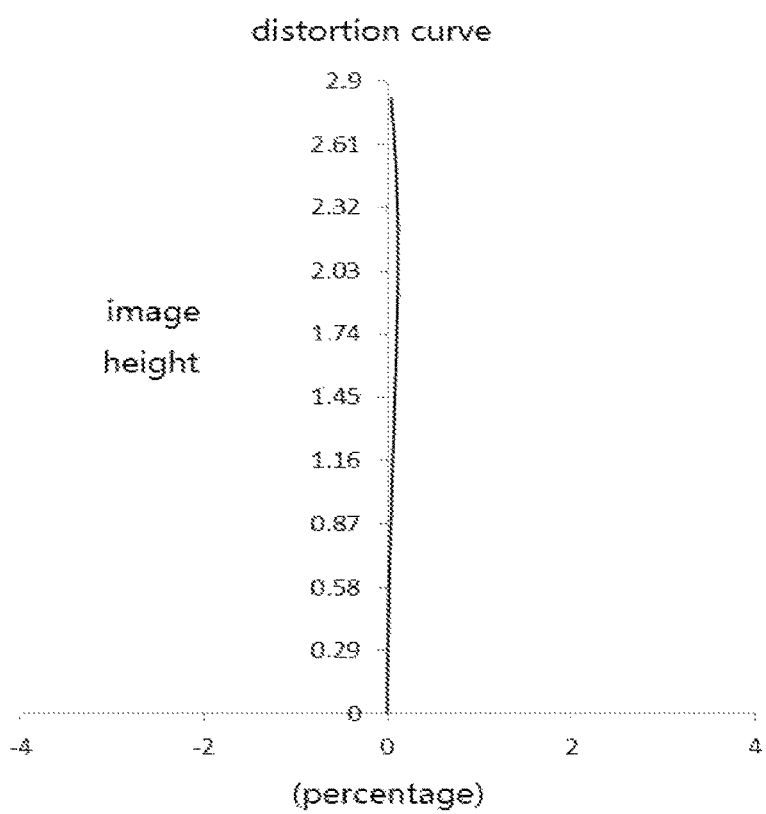
Figure 18D:
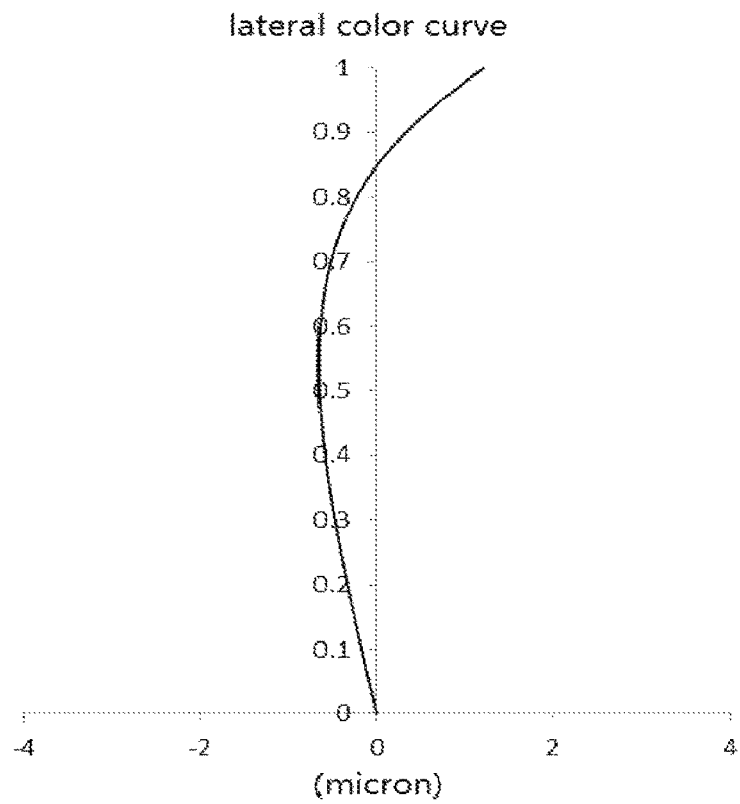

FIG. 16A, FIG. 17A and FIG. 18A show a longitudinal aberration curve when the zoom lens group of Embodiment 3 is in a wide-angle state, an intermediate state and a long-focus state, respectively, and represent convergence focus deviation of light rays of different wavelengths after passing through the lens. FIG. 16B, FIG. 17B and FIG. 18B show an astigmatism curve when the zoom lens group of Embodiment 3 is in a wide-angle state, an intermediate state and a long-focus state, respectively, and represent a meridian image surface curvature and a sagittal image surface curvature. FIG. 16C, FIG. 17C and FIG. 18C show a distortion curve when the zoom lens group of Embodiment 3 is in a wide-angle state, an intermediate state and a long-focus state, respectively, and represent distortion values corresponding to different image heights. FIG. 16D, FIG. 17D and FIG. 18D show a lateral color curve of the zoom lens group of Embodiment 3 is in a wide-angle state, an intermediate state and a long-focus state, and represent deviation of light at different image heights on the imaging surface after the light passes through the lens. According to FIG. 16A to FIG. 18D, it can be determined that the zoom lens group provided in Embodiment 3 can achieve a good imaging quality in various states.

Embodiment 4

Figure 19:
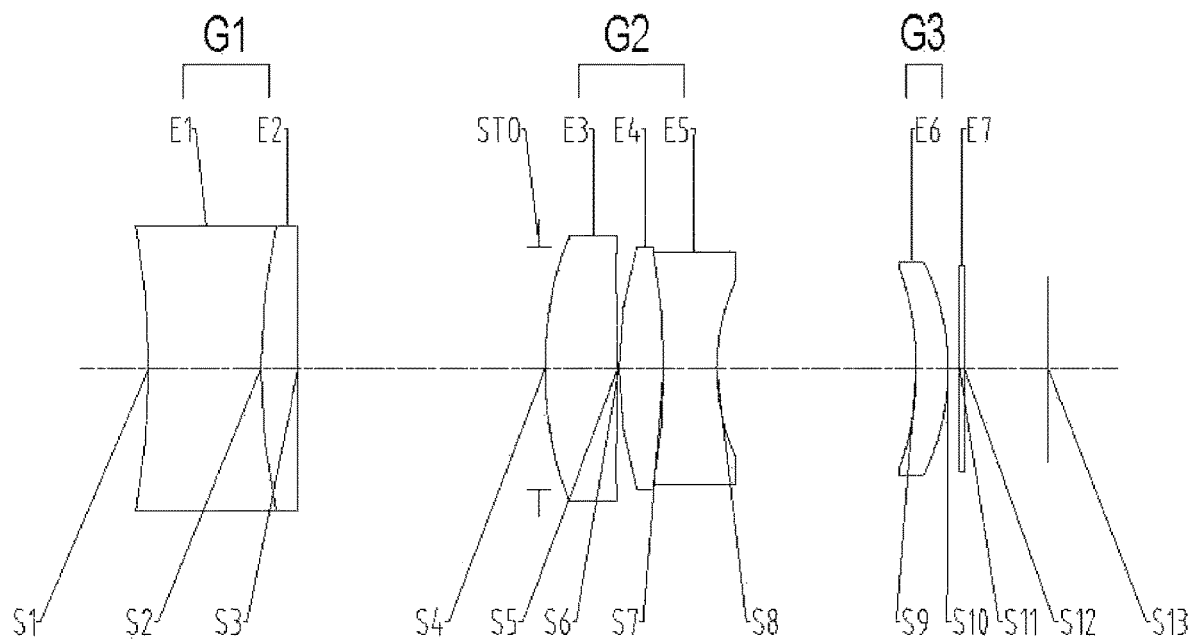
FIG. 19 shows a schematic structure diagram of a zoom lens group according to Embodiment 4 of the disclosure in a wide-angle state.
Figure 20:
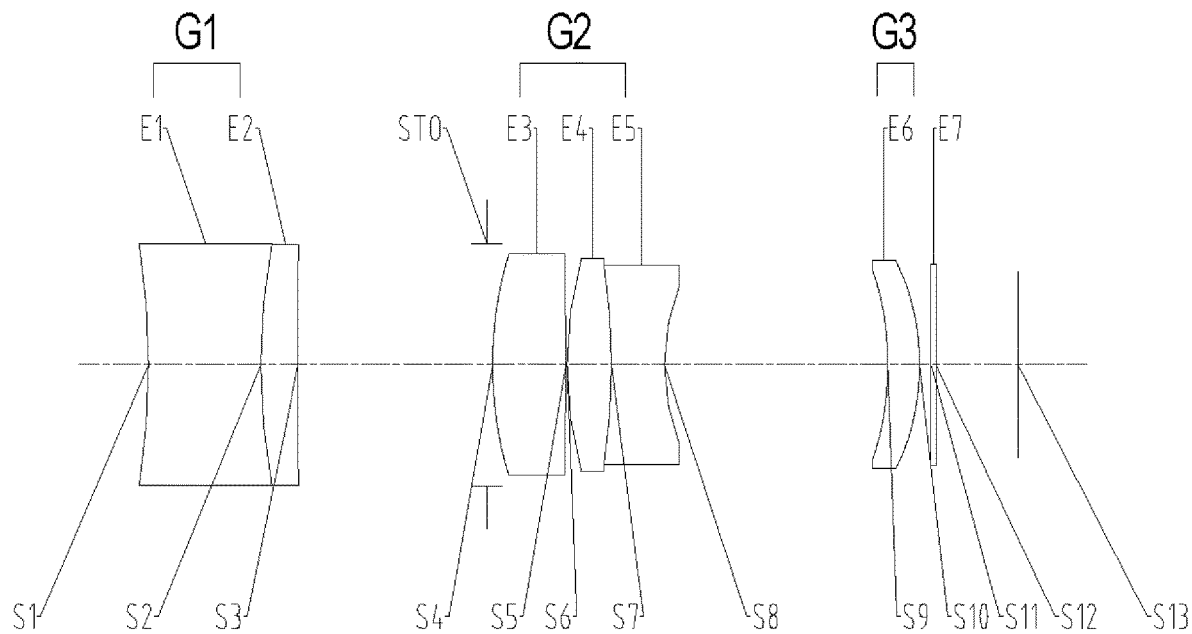
FIG. 20 shows a schematic structure diagram of the zoom lens group according to Embodiment 4 of the disclosure in an intermediate state during switching from a wide-angle state to a long-focus state.
Figure 21:
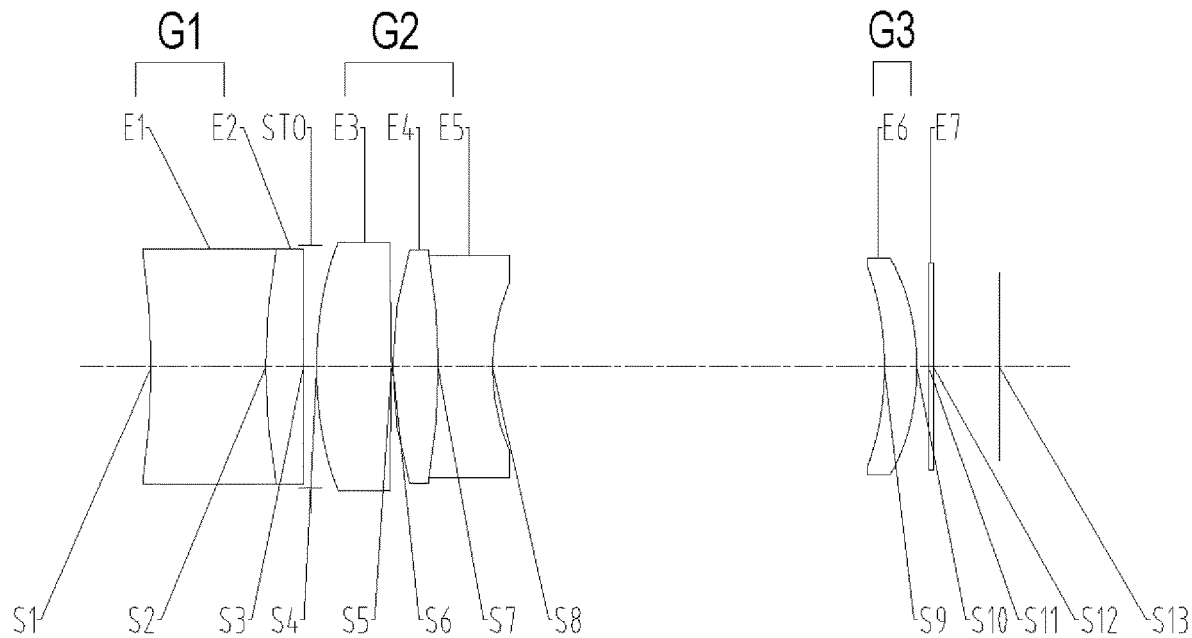
FIG. 21 shows a schematic structure diagram of the zoom lens group according to Embodiment 4 of the disclosure in a long-focus state.

A zoom lens group according to Embodiment 4 of the disclosure will be described below with reference to FIG. 19 to FIG. 24D. FIG. 19 shows a schematic structure diagram of a zoom lens group according to Embodiment 4 of the disclosure in a wide-angle state. FIG. 20 shows a schematic structure diagram of the zoom lens group according to Embodiment 4 of the disclosure in an intermediate state during switching from a wide-angle state to a long-focus state. FIG. 21 shows a schematic structure diagram of the zoom lens group according to Embodiment 4 of the disclosure in a long-focus state.

As shown in FIG. 19 to FIG. 21, the zoom lens group sequentially includes from an object side to an image side: a first lens group G1 (a first lens E1 and a second lens E2), a diaphragm STO, a second lens group G2 (a third lens E3, a fourth lens E4 and a fifth lens E5), a third lens group G3 (a sixth lens E6), an optical filter E7 and an imaging surface S13.

An object-side surface S1 of the first lens E1 is a concave surface, and an image-side surface S2 thereof is a concave surface. An object-side surface S2 of the second lens E2 is a convex surface, and an image-side surface S3 thereof is a concave surface. An object-side surface S4 of the third lens E3 is a convex surface, and an image-side surface S5 thereof is a convex surface. An object-side surface S6 of the fourth lens E4 is a convex surface, and an image-side surface S7 thereof is a convex surface. An object-side surface S7 of the fifth lens E5 is a concave surface, and an image-side surface S8 thereof is a concave surface. An object-side surface S9 of the sixth lens E6 is a concave surface, and an image-side surface S10 thereof is a convex surface. The optical filter E7 has an object-side surface S11 and an image-side surface S12. Light from an object sequentially passes through the surfaces S1 to S12 and is finally imaged on the imaging surface S13.

Table 10 shows basic parameters of the zoom lens group of Embodiment 4, wherein the units of curvature radius and thickness/distance are millimeter (mm).

TABLE 10

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Spherical | −16.7574 | 4.8626 | 1.81 | 35.0 | |
| S2 | Spherical | 13.8706 | 1.6330 | 1.93 | 20.9 | |
| S3 | Spherical | 334.2591 | D3 | | | |
| STO | Spherical | Infinite | 0.2557 | | | |
| S4 | Aspherical | 8.4193 | 3.1774 | 1.55 | 56.1 | 0.0000 |
| S5 | Aspherical | −38.5249 | 0.0500 | | | 0.0000 |
| S6 | Spherical | 8.7678 | 1.9386 | 1.77 | 49.1 | |
| S7 | Spherical | −13.9766 | 2.3000 | 1.73 | 27.8 | |
| S8 | Spherical | 4.6835 | D9 | | | |
| S9 | Aspherical | −6.9426 | 1.3799 | 1.68 | 19.2 | 0.0000 |
| S10 | Aspherical | −5.1598 | 0.5000 | | | 0.0000 |
| S11 | Spherical | Infinite | 0.2100 | 1.52 | 64.2 | |
| S12 | Spherical | Infinite | D13 | | | |
| S13 | Spherical | Infinite | | | | |

In the embodiment, by changing a separation distance D3 between the first lens group and the second lens group on the optical axis, a separation distance D9 between the second lens group and the third lens group on the optical axis, and a distance D13 between an image-side surface of the optical filter and the imaging surface of the zoom lens group on the optical axis, the zoom lens group is switched from a wide-angle state to a long-focus state or from a long-focus state to a wide-angle state. A total effective focal length f, an aperture value Fno and a maximum field of view (FOV) of the zoom lens group, a total length TTL of the zoom lens group, and a half of the length of the diagonal length of an effective pixel region on the imaging surface S13 of the zoom lens group change along with the zoom lens group switching from a wide-angle state to a long-focus state or from a long-focus state to a wide-angle state.

Table 11 is a table of parameters changing along with different states of the zoom lens group of Embodiment 4, wherein the units of f, TTL, ImgH, D3, D9 and D13 are all millimeter (mm), and the unit of FOV is degree (°).

TABLE 11

| Parameter | Wide-angle state | Intermediate state | Long-focus state |
|---|---|---|---|
| f | 13.04 | 14.67 | 26.08 |
| Fno | 2.90 | 3.54 | 4.43 |
| FOV | 24.4 | 21.8 | 12.3 |
| TTL | 39.06 | 37.72 | 36.11 |
| ImgH | 2.79 | 2.81 | 2.81 |
| D3 | 10.71 | 8.43 | 0.56 |
| D9 | 8.67 | 9.69 | 16.70 |
| D13 | 3.62 | 3.55 | 2.80 |

Table 12 shows high-order coefficients which can be used for the aspherical mirror surfaces in Embodiment 4, wherein the aspherical surface types can be defined by formula (1) given in Embodiment 1 above.

TABLE 12

| Surface number | A4 | A6 | A8 | A10 | A12 | A14 | A16 |
|---|---|---|---|---|---|---|---|
| S4 | 7.0139E−05 | 1.9447E−05 | −2.9696E−06 | 4.7200E−07 | −3.7949E−08 | 1.6375E−09 | −2.8454E−11 |
| S5 | 4.7255E−04 | 2.9338E−05 | −4.9024E−06 | 8.6133E−07 | −7.6288E−08 | 3.6374E−09 | −6.9011E−11 |
| S9 | −6.0232E−04 | −5.1024E−05 | 1.4877E−05 | −2.4845E−06 | 1.1474E−07 | 0.0000E+00 | 0.0000E+00 |
| S10 | 3.4023E−04 | −3.1810E−05 | 9.1801E−06 | −1.2078E−06 | 4.7410E−08 | 0.0000E+00 | 0.0000E+00 |

Figure 22A:
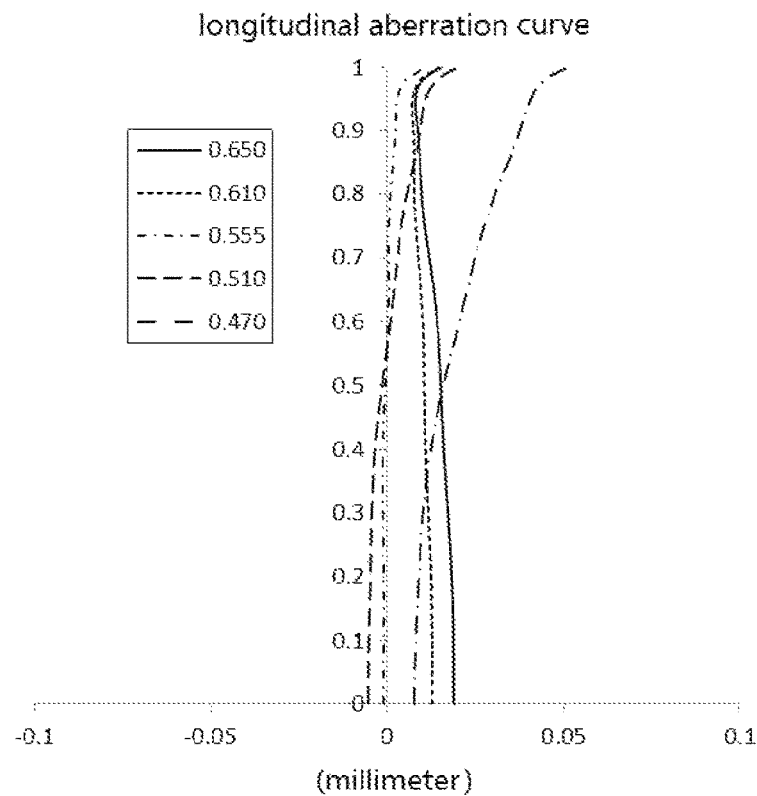
FIG. 22A to FIG. 22D show a longitudinal aberration curve, an astigmatism curve, a distortion curve and a lateral color curve of the zoom lens group of Embodiment 4 is in a wide-angle state, respectively.
Figure 22B:
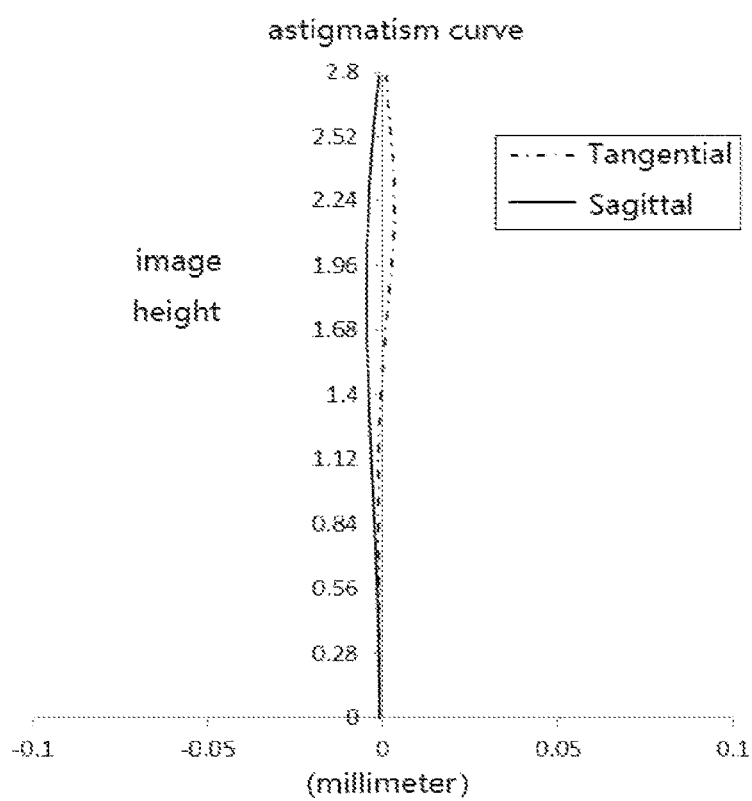
Figure 22C:
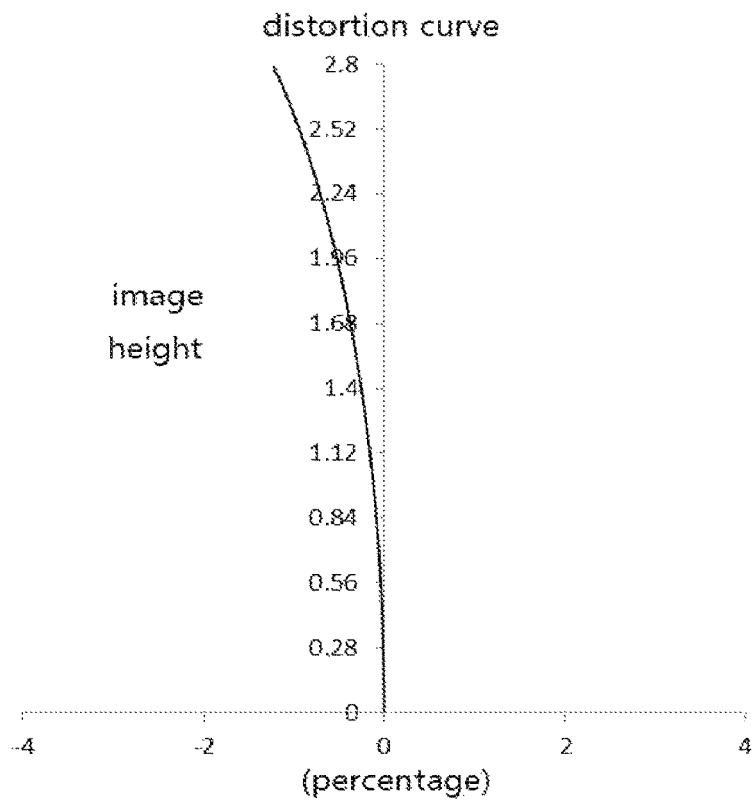
Figure 22D:
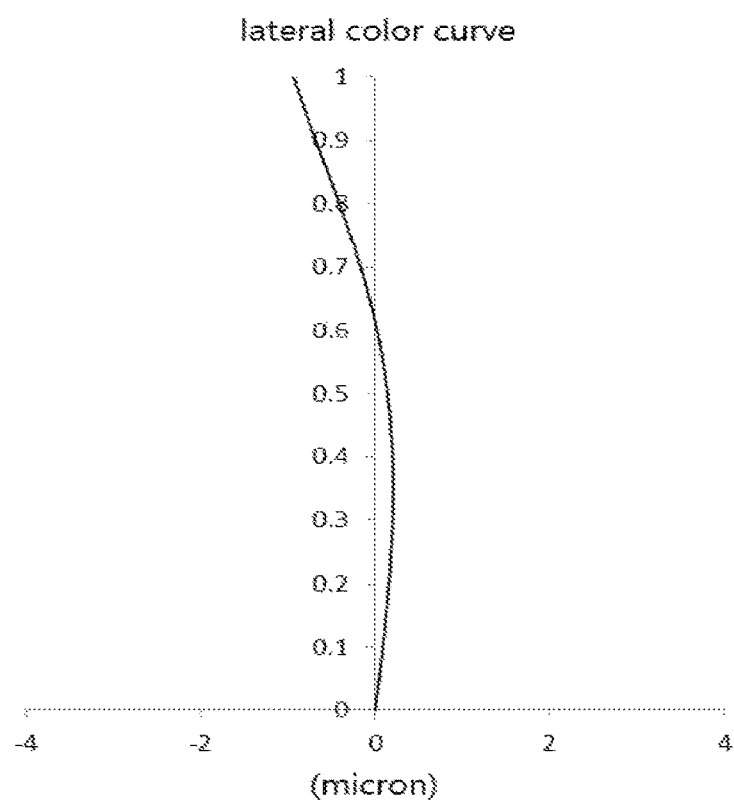
Figure 23A:
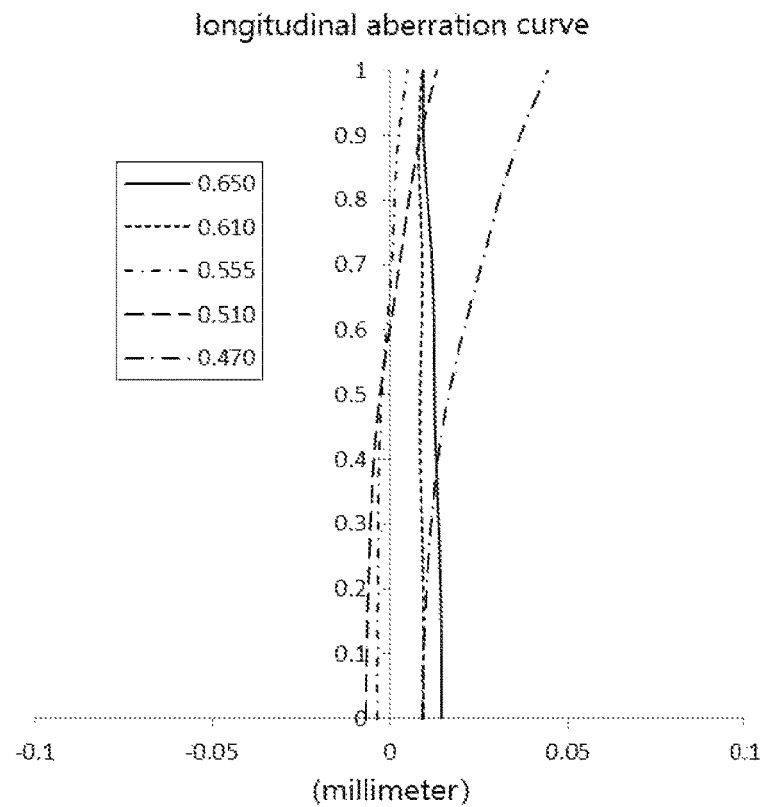
FIG. 23A to FIG. 23D show a longitudinal aberration curve, an astigmatism curve, a distortion curve and a lateral color curve of the zoom lens group of Embodiment 4 is in an intermediate state during switching from a wide-angle state to a long-focus state, respectively.
Figure 23B:
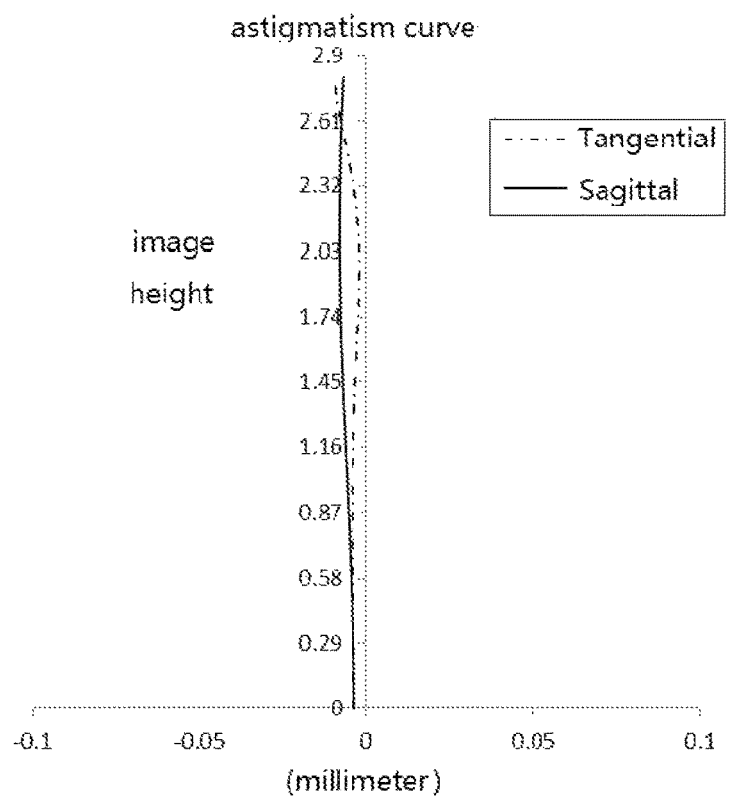
Figure 23C:
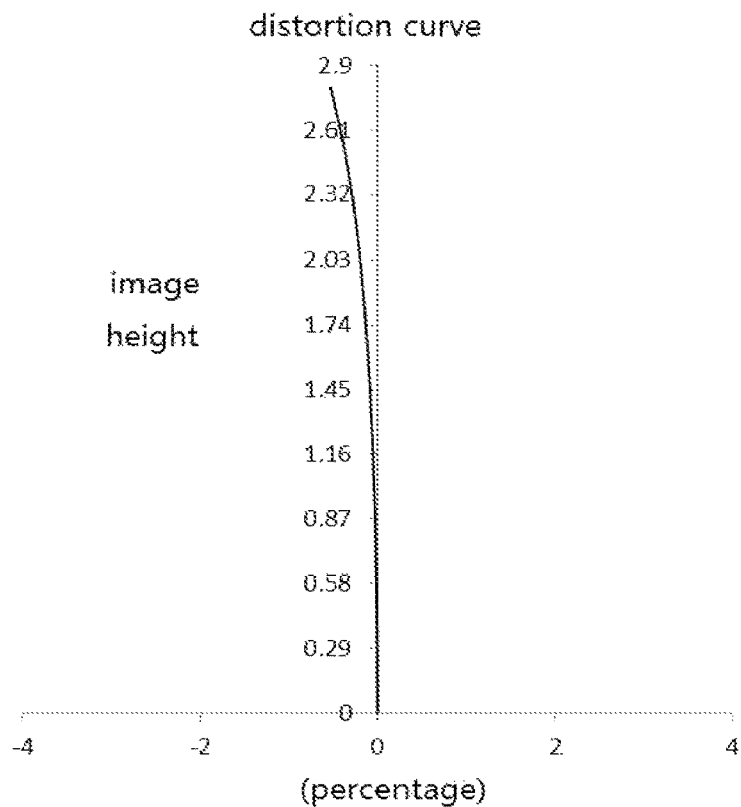
Figure 23D:
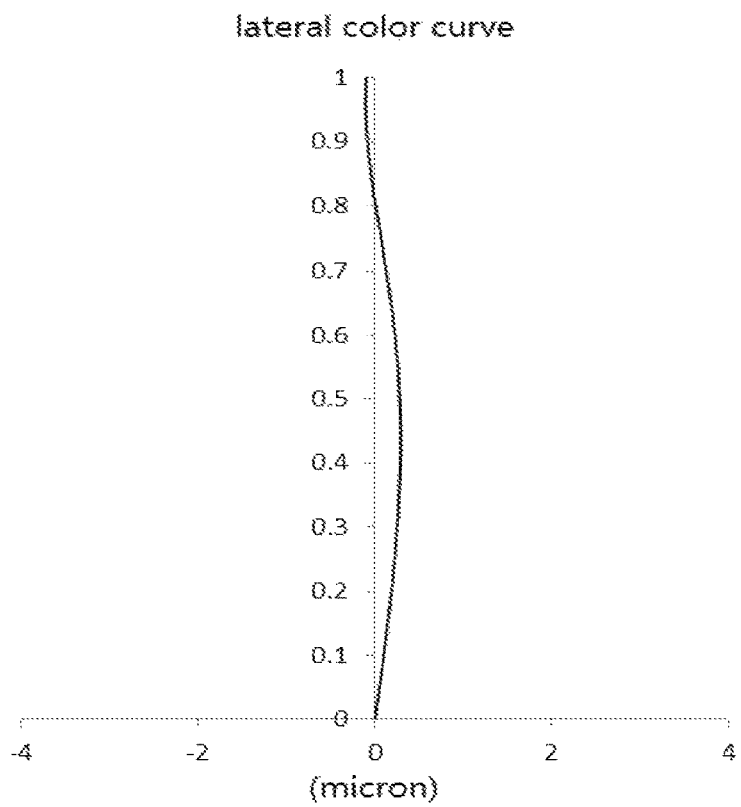
Figure 24A:
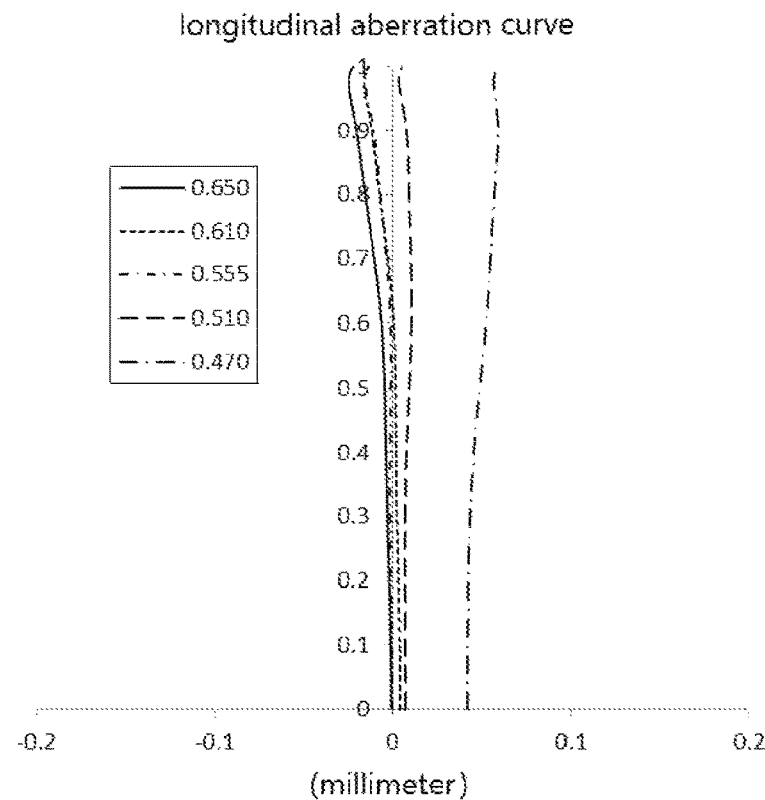
FIG. 24A to FIG. 24D show a longitudinal aberration curve, an astigmatism curve, a distortion curve and a lateral color curve of the zoom lens group of Embodiment 4 is in a long-focus state, respectively.
Figure 24B:
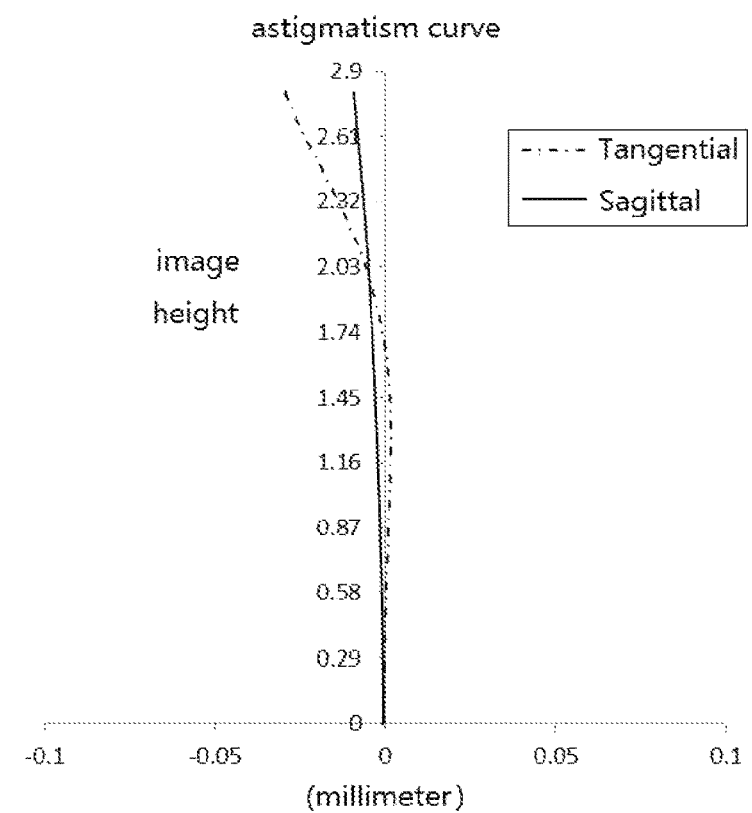
Figure 24C:
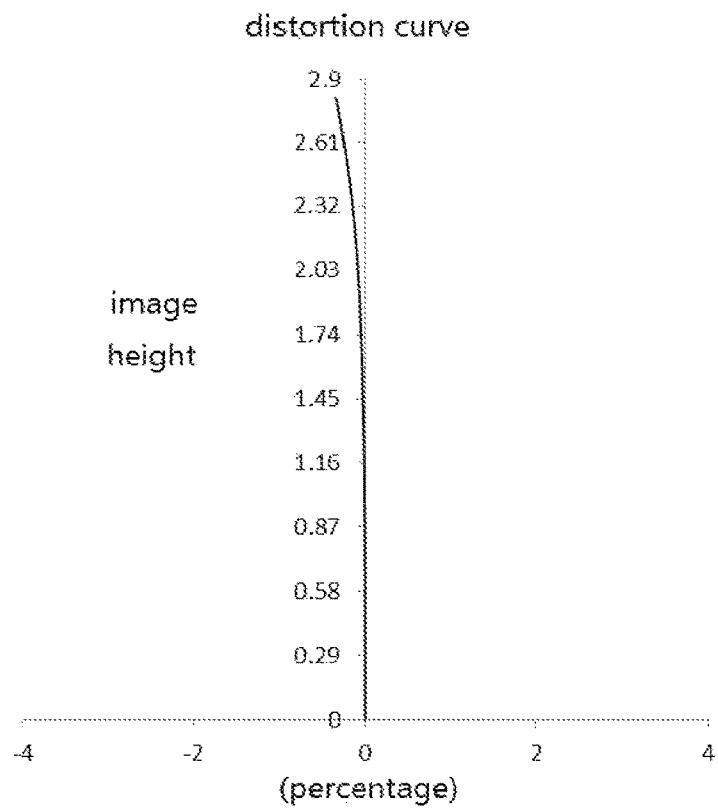
Figure 24D:
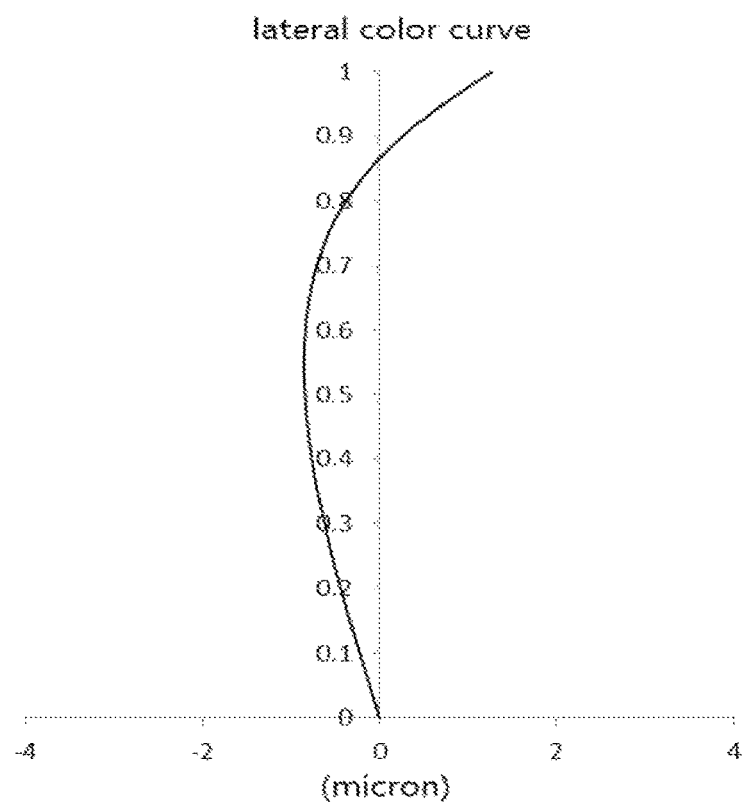

FIG. 22A, FIG. 23A and FIG. 24A show a longitudinal aberration curve when the zoom lens group of Embodiment 4 is in a wide-angle state, an intermediate state and a long-focus state, respectively, and represent convergence focus deviation of light rays of different wavelengths after passing through the lens. FIG. 22B, FIG. 23B and FIG. 24B show an astigmatism curve when the zoom lens group of Embodiment 4 is in a wide-angle state, an intermediate state and a long-focus state, respectively, and represent a meridian image surface curvature and a sagittal image surface curvature. FIG. 22C, FIG. 23C and FIG. 24C show a distortion curve when the zoom lens group of Embodiment 4 is in a wide-angle state, an intermediate state and a long-focus state, respectively, and represent distortion values corresponding to different image heights. FIG. 22D, FIG. 23D and FIG. 24D show a lateral color curve of the zoom lens group of Embodiment 4 is in a wide-angle state, an intermediate state and a long-focus state, and represent deviation of light at different image heights on the imaging surface after the light passes through the lens. According to FIG. 22A to FIG. 24D, it can be determined that the zoom lens group provided in Embodiment 4 can achieve a good imaging quality in various states.

Embodiment 5

Figure 25:
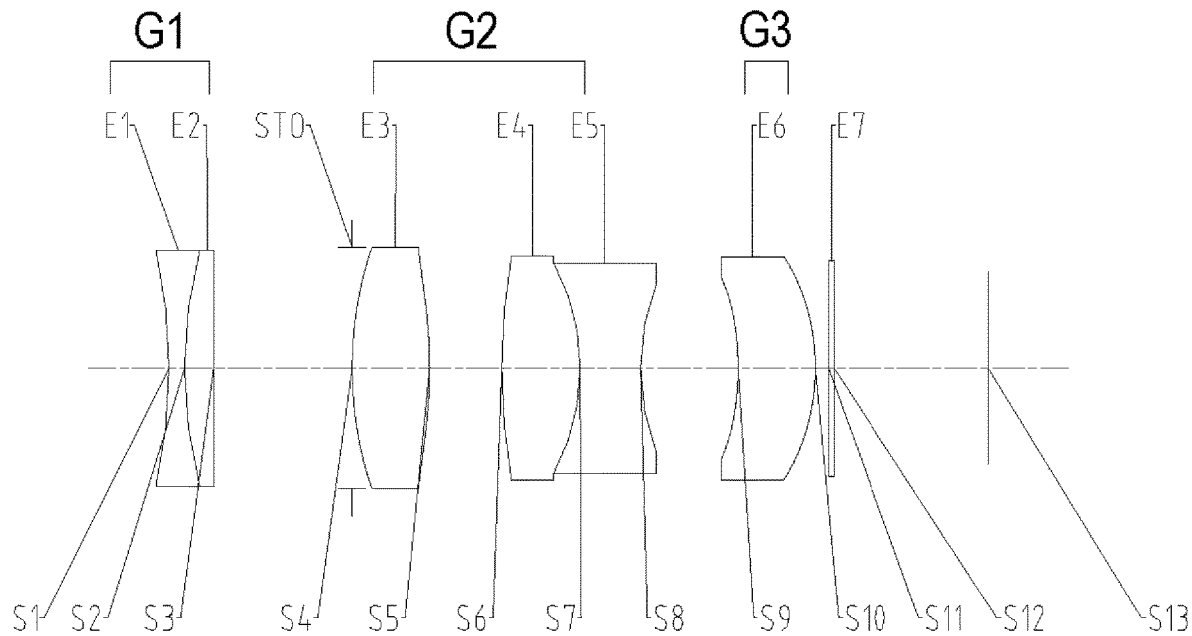
FIG. 25 shows a schematic structure diagram of a zoom lens group according to Embodiment 5 of the disclosure in a wide-angle state.
Figure 26:
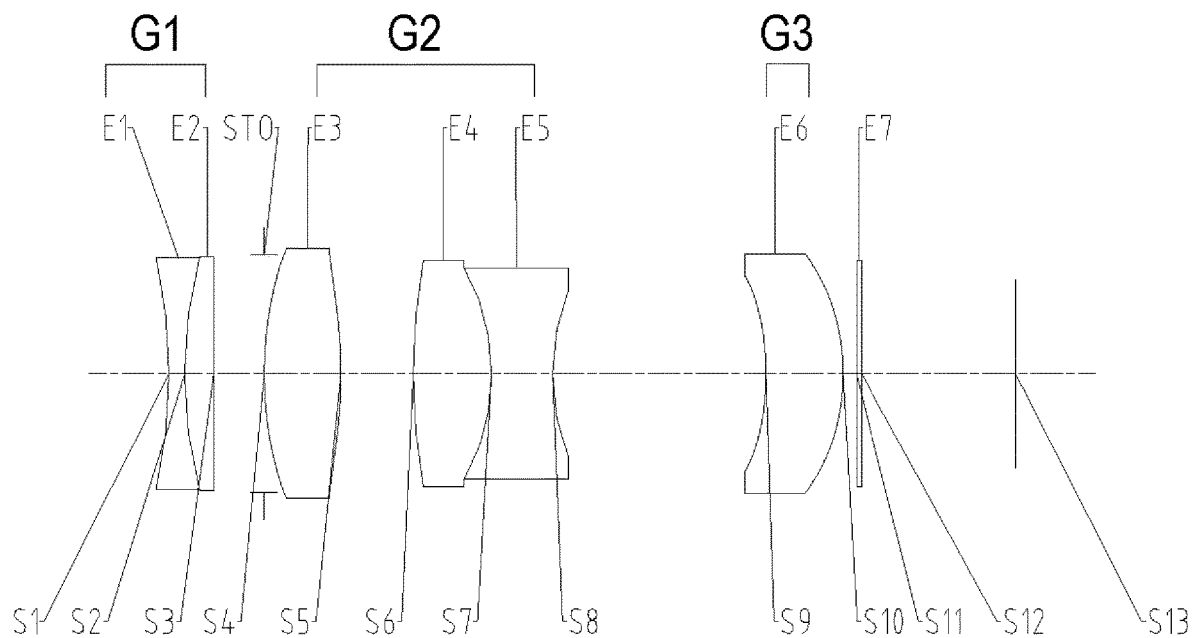
FIG. 26 shows a schematic structure diagram of the zoom lens group according to Embodiment 5 of the disclosure in an intermediate state during switching from a wide-angle state to a long-focus state.
Figure 27:
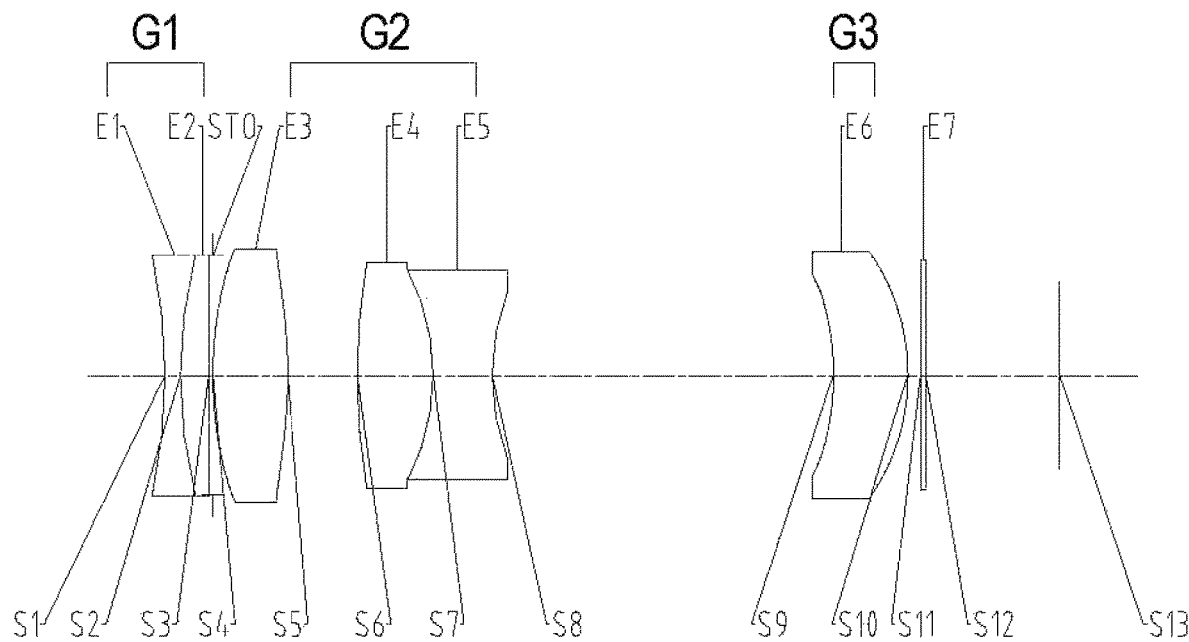
FIG. 27 shows a schematic structure diagram of the zoom lens group according to Embodiment 5 of the disclosure in a long-focus state.

A zoom lens group according to Embodiment 5 of the disclosure will be described below with reference to FIG. 25 to FIG. 30D. FIG. 25 shows a schematic structure diagram of a zoom lens group according to Embodiment 5 of the disclosure in a wide-angle state. FIG. 26 shows a schematic structure diagram of the zoom lens group according to Embodiment 5 of the disclosure in an intermediate state during switching from a wide-angle state to a long-focus state. FIG. 27 shows a schematic structure diagram of the zoom lens group according to Embodiment 5 of the disclosure in a long-focus state.

As shown in FIG. 25 to FIG. 27, the zoom lens group sequentially includes from an object side to an image side: a first lens group G1 (a first lens E1 and a second lens E2), a diaphragm STO, a second lens group G2 (a third lens E3, a fourth lens E4 and a fifth lens E5), a third lens group G3 (a sixth lens E6), an optical filter E7 and an imaging surface S13.

An object-side surface S1 of the first lens E1 is a concave surface, and an image-side surface S2 thereof is a concave surface. An object-side surface S2 of the second lens E2 is a convex surface, and an image-side surface S3 thereof is a concave surface. An object-side surface S4 of the third lens E3 is a convex surface, and an image-side surface S5 thereof is a convex surface. An object-side surface S6 of the fourth lens E4 is a convex surface, and an image-side surface S7 thereof is a convex surface. An object-side surface S7 of the fifth lens E5 is a concave surface, and an image-side surface S8 thereof is a concave surface. An object-side surface S9 of the sixth lens E6 is a concave surface, and an image-side surface S10 thereof is a convex surface. The optical filter E7 has an object-side surface S11 and an image-side surface S12. Light from an object sequentially passes through the surfaces S1 to S12 and is finally imaged on the imaging surface S13.

Table 13 shows basic parameters of the zoom lens group of Embodiment 5, wherein the units of curvature radius and thickness/distance are millimeter (mm).

TABLE 13

| Surface number | Surface type | Curvature radius | Thickness/ distance | Material Refractive index | Abbe number | Conic coefficient |
|---|---|---|---|---|---|---|
| OBJ | Spherical | Infinite | Infinite | | | |
| S1 | Spherical | −13.5260 | 0.6000 | 1.81 | 35.0 | |
| S2 | Spherical | 11.6905 | 1.0920 | 1.93 | 20.9 | |
| S3 | Spherical | 261.3087 | D3 | | | |
| STO | Spherical | Infinite | 0.0000 | | | |
| S4 | Aspherical | 9.5667 | 2.9080 | 1.55 | 56.1 | 0.0000 |
| S5 | Aspherical | −12.0000 | 2.7166 | | | 0.0000 |
| S6 | Spherical | 16.1237 | 2.9386 | 1.78 | 49.6 | |
| S7 | Spherical | −5.6013 | 2.3000 | 1.73 | 28.3 | |
| S8 | Spherical | 5.7812 | D9 | | | |
| S9 | Aspherical | −6.9864 | 2.9031 | 1.67 | 20.4 | 0.0000 |
| S10 | Aspherical | −5.2879 | 0.5000 | | | 0.0000 |
| S11 | Spherical | Infinite | 0.2100 | 1.52 | 64.2 | |
| S12 | Spherical | Infinite | D13 | | | |
| S13 | Spherical | Infinite | | | | |

In the embodiment, by changing a separation distance D3 between the first lens group and the second lens group on the optical axis, a separation distance D9 between the second lens group and the third lens group on the optical axis, and a distance D13 between an image-side surface of the optical filter and the imaging surface of the zoom lens group on the optical axis, the zoom lens group is switched from a wide-angle state to a long-focus state or from a long-focus state to a wide-angle state. A total effective focal length f, an aperture value Fno and a maximum field of view (FOV) of the zoom lens group, a total length TTL of the zoom lens group, and a half of the length of the diagonal length of an effective pixel region on the imaging surface S13 of the zoom lens group change along with the zoom lens group switching from a wide-angle state to a long-focus state or from a long-focus state to a wide-angle state.

Table 14 is a table of parameters changing along with different states of the zoom lens group of Embodiment 5, wherein the units of f, TTL, ImgH, D3, D9 and D13 are all millimeter (mm), and the unit of FOV is degree (°).

TABLE 14

| Parameter | Wide-angle state | Intermediate state | Long-focus state |
|---|---|---|---|
| f | 15.04 | 22.01 | 30.09 |
| Fno | 2.90 | 3.54 | 4.43 |

TABLE 14-continued

| Parameter | Wide-angle state | Intermediate state | Long-focus state |
|---|---|---|---|
| FOV | 21.2 | 14.6 | 10.7 |
| TTL | 30.87 | 31.91 | 34.78 |
| ImgH | 2.85 | 2.86 | 2.84 |
| D3 | 5.23 | 1.90 | 0.17 |
| D9 | 3.67 | 8.04 | 13.26 |
| D13 | 5.81 | 5.80 | 5.19 |

Table 15 shows high-order coefficients which can be used for the aspherical mirror surfaces in Embodiment 5, wherein the aspherical surface types can be defined by formula (1) given in Embodiment 1 above.

TABLE 15

| Surface number | A4 | A6 | A8 | A10 | A12 | A14 | A16 |
|---|---|---|---|---|---|---|---|
| S4 | −4.0896E−05 | 3.0602E−05 | −6.5158E−06 | 1.0224E−06 | −7.8305E−08 | 3.0820E−09 | −4.5991E−11 |
| S5 | 4.9198E−04 | 5.3547E−05 | −1.2439E−05 | 1.8724E−06 | −1.4221E−07 | 5.4857E−09 | −7.7506E−11 |
| S9 | −9.8977E−04 | 2.8056E−04 | −9.0792E−05 | 1.0057E−05 | −4.3939E−07 | 0.0000E+00 | 0.0000E+00 |
| S10 | 2.0021E−04 | 1.0418E−04 | −1.9838E−05 | 1.4335E−06 | −3.9364E−08 | 0.0000E+00 | 0.0000E+00 |

Figure 28A:
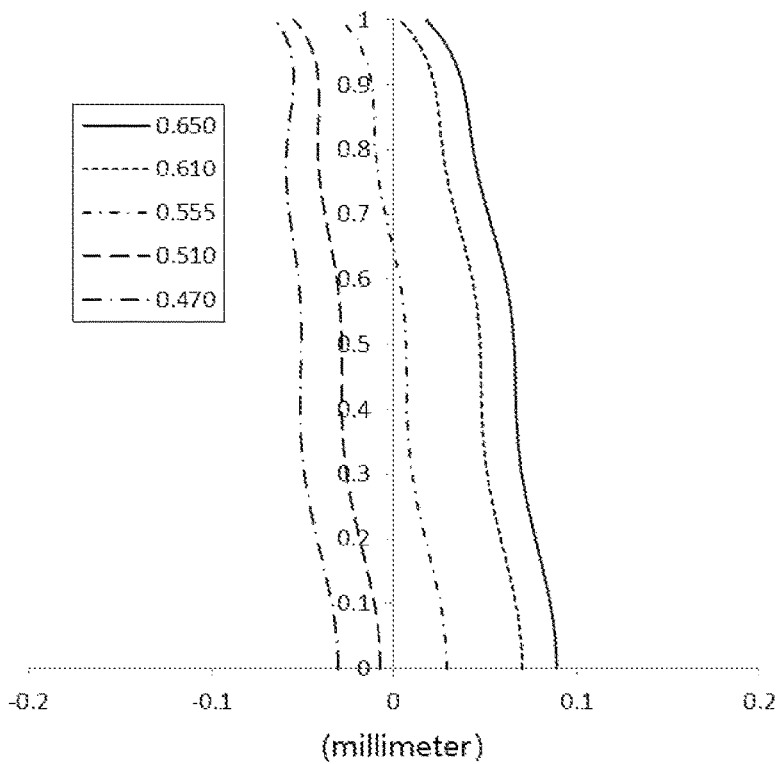
FIG. 28A to FIG. 28D show a longitudinal aberration curve, an astigmatism curve, a distortion curve and a lateral color curve of the zoom lens group of Embodiment 5 is in a wide-angle state, respectively.
Figure 28B:
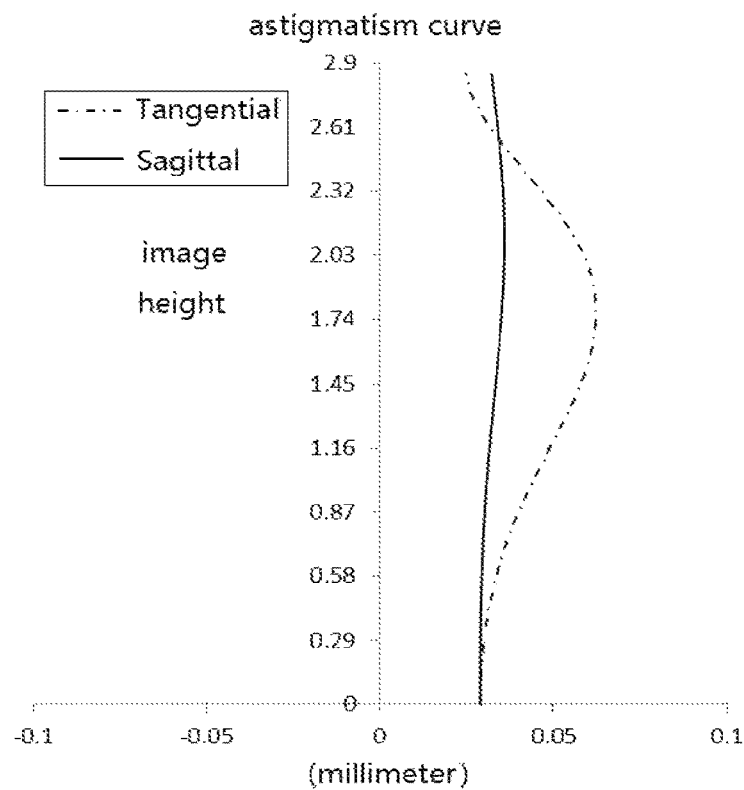
Figure 28C:
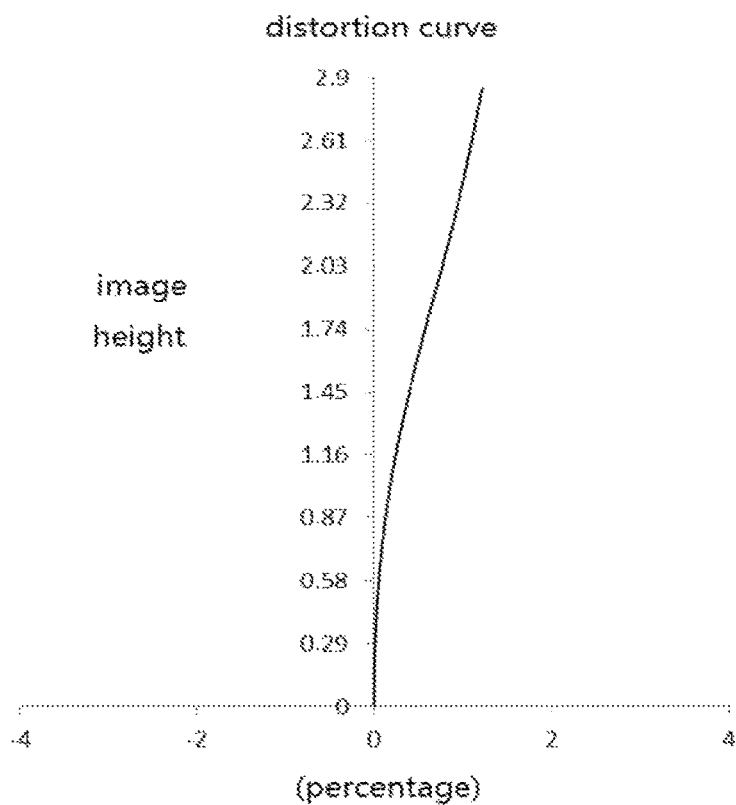
Figure 28D:
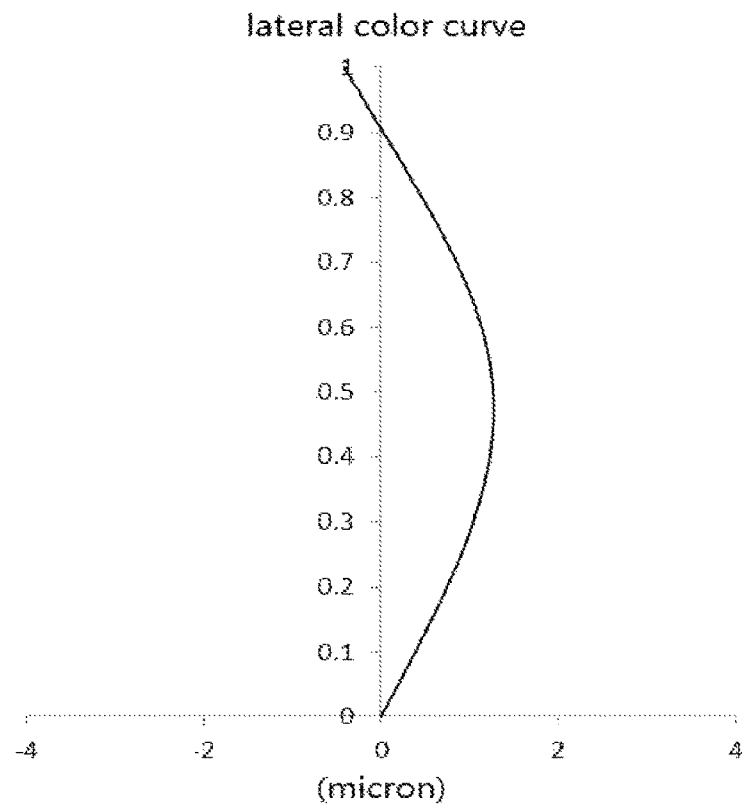
Figure 29A:
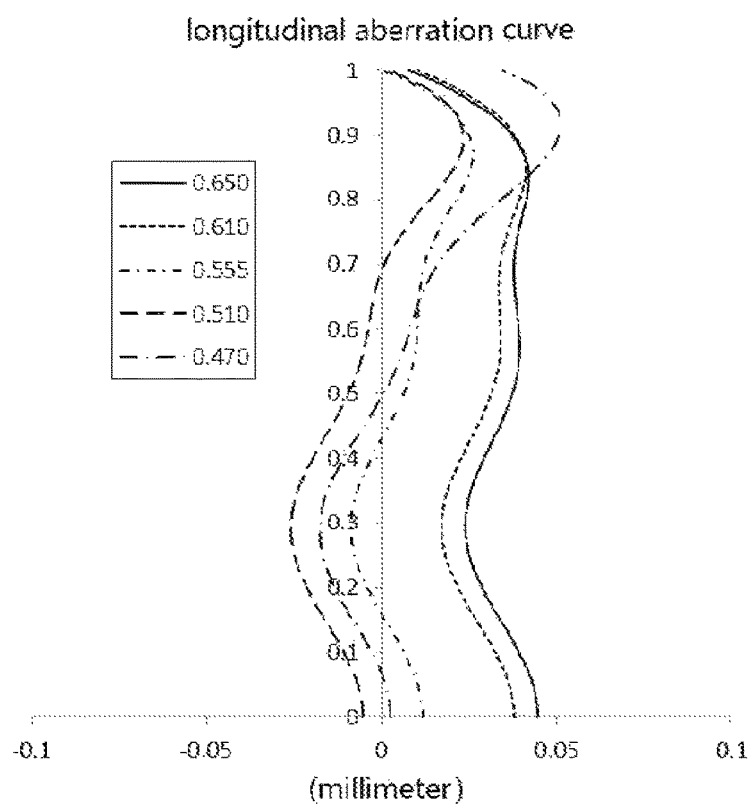
FIG. 29A to FIG. 29D show a longitudinal aberration curve, an astigmatism curve, a distortion curve and a lateral color curve of the zoom lens group of Embodiment 5 is in an intermediate state during switching from a wide-angle state to a long-focus state, respectively.
Figure 29B:
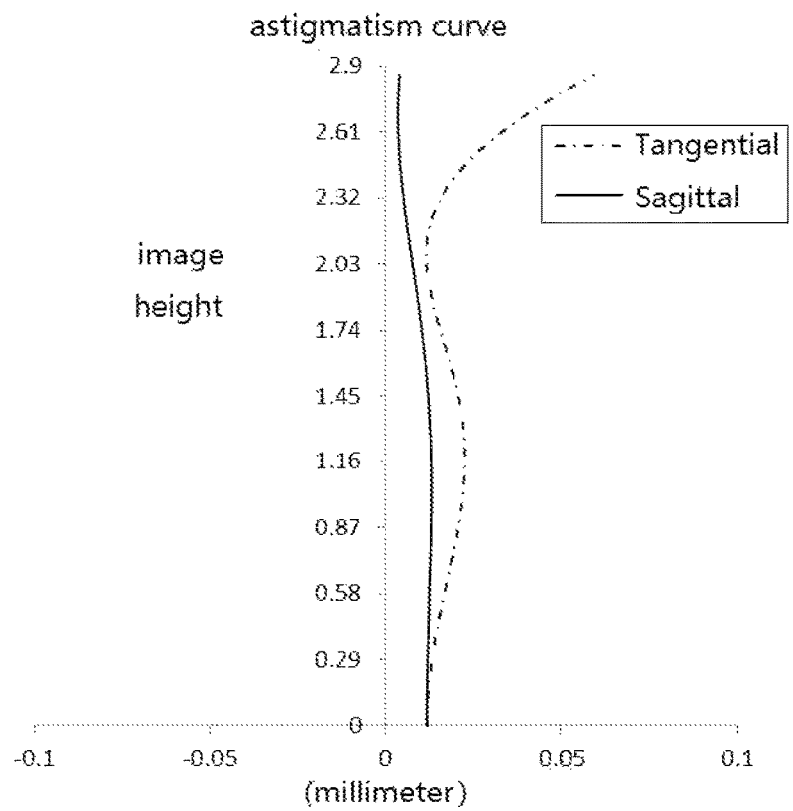
Figure 29C:
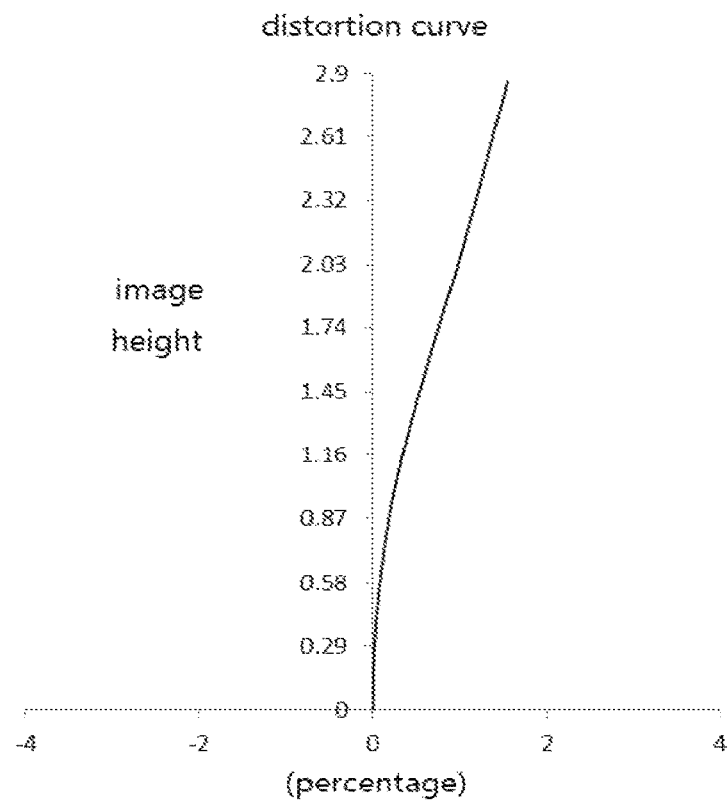
Figure 29D:
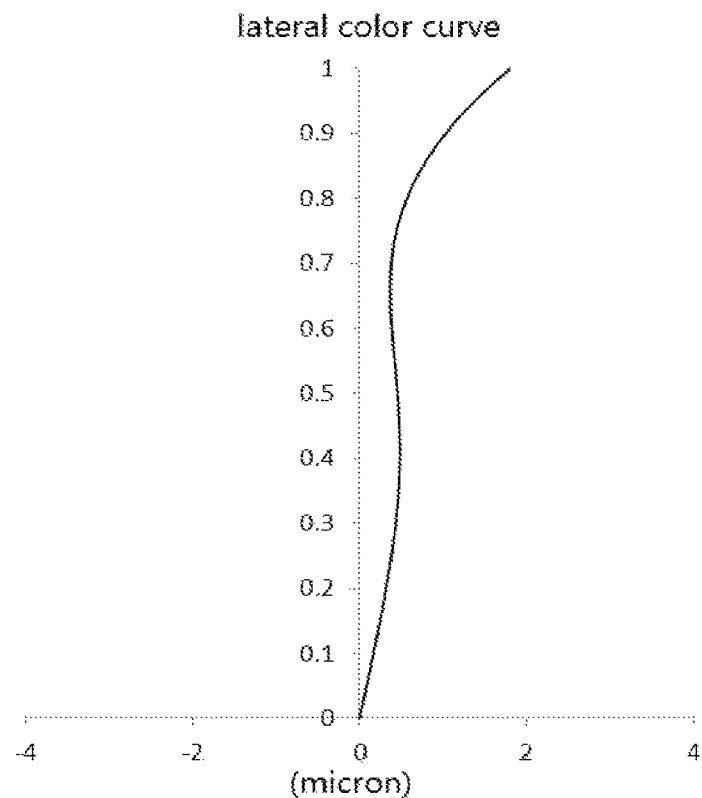
Figure 30A:
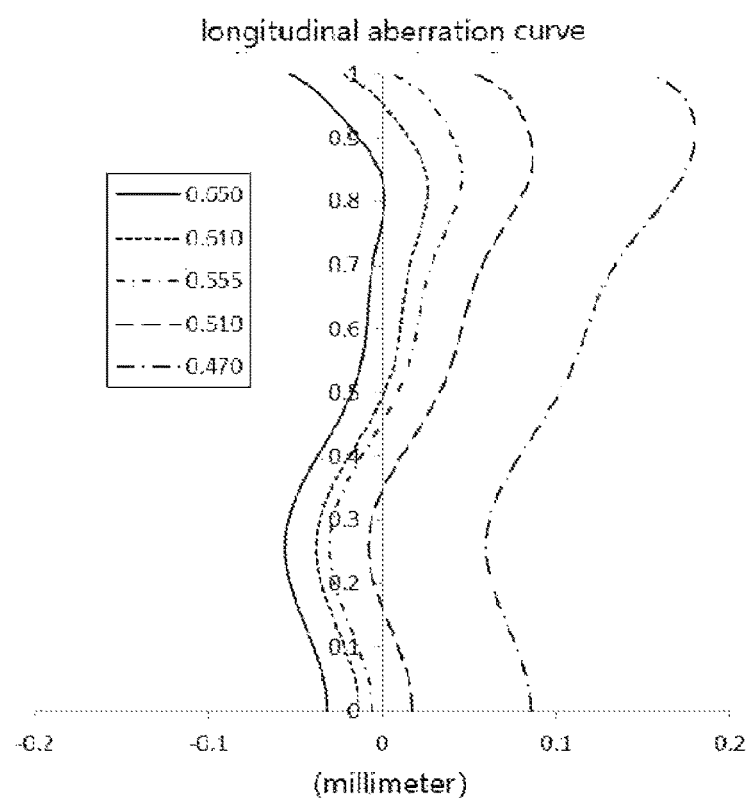
FIG. 30A to FIG. 30D show a longitudinal aberration curve, an astigmatism curve, a distortion curve and a lateral color curve of the zoom lens group of Embodiment 5 is in a long-focus state, respectively.
Figure 30B:
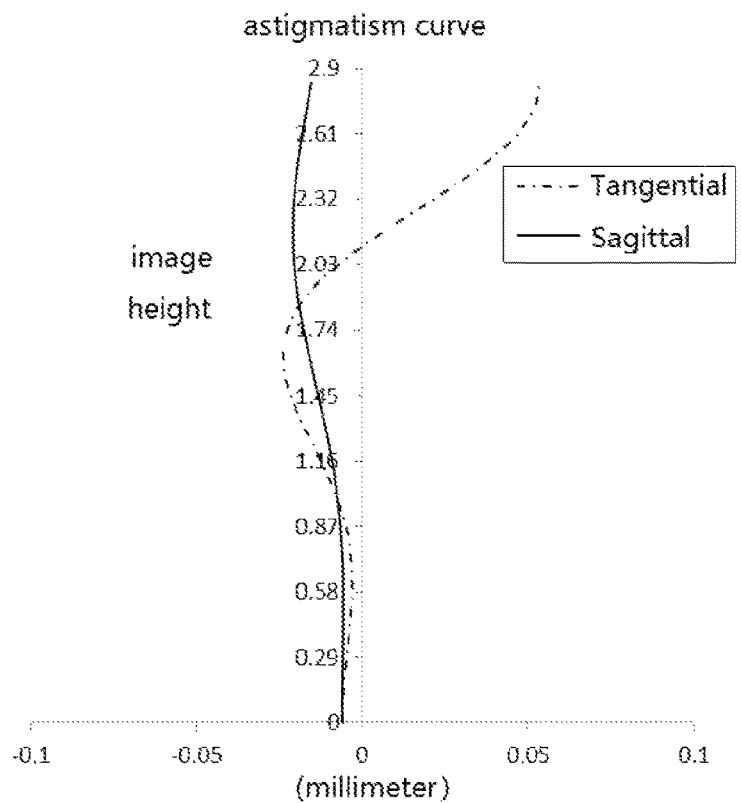
Figure 30C:
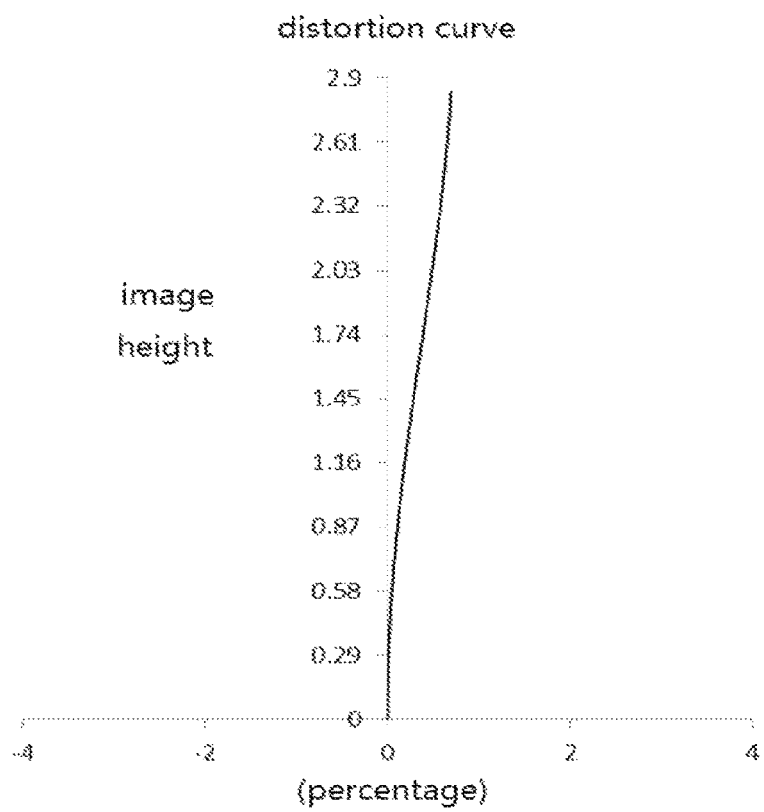
Figure 30D:
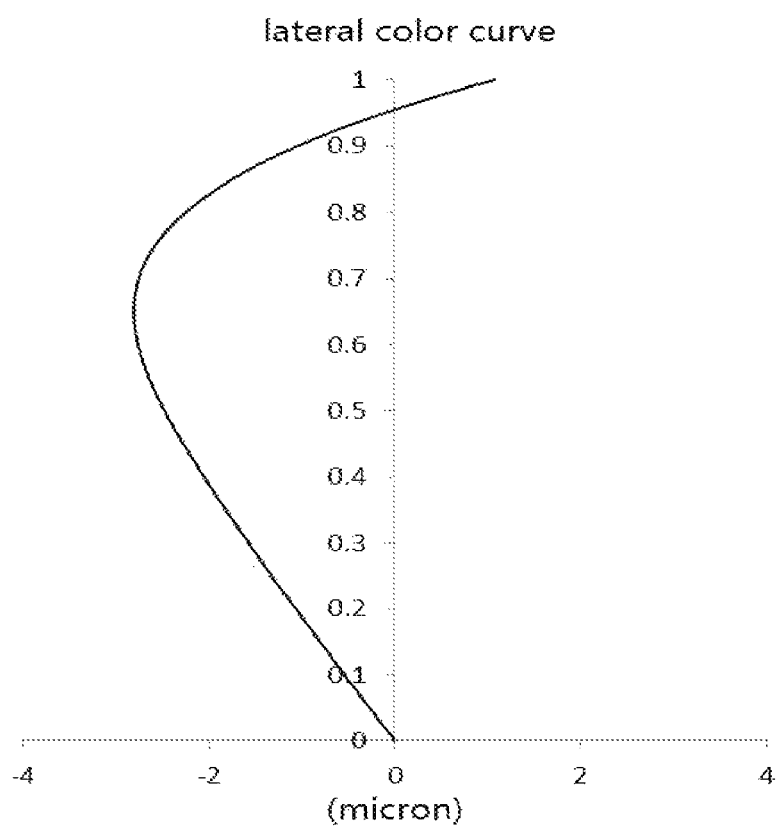

FIG. 28A, FIG. 29A and FIG. 30A show a longitudinal aberration curve when the zoom lens group of Embodiment 5 is in a wide-angle state, an intermediate state and a long-focus state, respectively, and represent convergence focus deviation of light rays of different wavelengths after passing through the lens. FIG. 28B, FIG. 29B and FIG. 30B show an astigmatism curve when the zoom lens group of Embodiment 5 is in a wide-angle state, an intermediate state and a long-focus state, respectively, and represent a meridian image surface curvature and a sagittal image surface curvature. FIG. 28C, FIG. 29C and FIG. 30C show a distortion curve when the zoom lens group of Embodiment 5 is in a wide-angle state, an intermediate state and a long-focus state, respectively, and represent distortion values corresponding to different image heights. FIG. 28D, FIG. 29D and FIG. 30D show a lateral color curve of the zoom lens group of Embodiment 5 is in a wide-angle state, an intermediate state and a long-focus state, and represent deviation of light at different image heights on the imaging surface after the light passes through the lens. According to FIG. 28A to FIG. 30D, it can be determined that the zoom lens group provided in Embodiment 5 can achieve a good imaging quality in various states.

In conclusion, Embodiments 1 to 5 satisfy the relationships shown in Table 16.

TABLE 16

| Conditional expression/ Embodiment | 1 | 2 | 3 | 4 | 5 |
|---|---|---|---|---|---|
| FT/FW | 2.00 | 2.00 | 2.00 | 2.00 | 2.00 |
| F1/F2 | −2.05 | −2.17 | −1.93 | −1.92 | −1.92 |
| F3/F1 | −0.89 | −0.82 | −0.92 | −0.93 | −1.02 |
| FT/F3 | 1.38 | 1.36 | 1.20 | 1.15 | 1.55 |
| FOVT (°) | 10.7 | 10.7 | 12.1 | 12.3 | 10.7 |
| R9/R10 | 1.36 | 1.35 | 1.36 | 1.35 | 1.32 |
| R4/R6 | 0.90 | 0.88 | 0.97 | 0.96 | 0.59 |
| f11/f12 | −0.62 | −0.63 | −0.57 | −0.57 | −0.59 |
| (f21 + f23)/f22 | 1.11 | 1.17 | 1.18 | 1.17 | 1.17 |
| CT6/(CT1 + CT2) | 0.81 | 0.94 | 0.31 | 0.21 | 1.72 |

The disclosure further provides an imaging device, an electronic photosensitive element of the imaging device may be a charge coupled device (CCD) or a complementary metal oxide semiconductor (CMOS) element. The imaging device may be an independent imaging apparatus such as a digital camera, or may be an imaging module integrated in a mobile electronic apparatus such as a mobile phone. The imaging device is equipped with the zoom lens group described above.

The description above is only description about the preferred embodiments and adopted technical principles of the disclosure. A person skilled in the art would understand that the scope of present disclosure involved in the disclosure is not limited to the technical solutions formed by specifically combining the technical features above and should also cover other technical solutions formed by freely combining the technical features or equivalent features thereof without departing from the inventive concept, for example, technical solutions formed by mutually replacing the features above and the technical features with similar functions disclosed (but not limited to) in the disclosure.

What is claimed is:

1. A zoom lens group, sequentially comprising from an object side to an image side along an optical axis:
   a first lens group having a negative refractive power, the first lens group comprising a first lens and a second lens which are sequentially arranged along the optical axis, wherein the first lens and the second lens are glued to form a first cemented lens;
   a second lens group having a positive refractive power, the second lens group comprising a third lens, a fourth lens and a fifth lens which are sequentially arranged along the optical axis, wherein the fourth lens and the fifth lens are glued to form a second cemented lens, an object-side surface of the fifth lens is concave surface, an object-side surface of the fourth lens is convex surface, an image-side surface of the fourth lens is convex surface; and
   a third lens group having a positive refractive power, the third lens group comprising a sixth lens;
   a separation distance between the first lens group and the second lens group on the optical axis and a separation distance between the second lens group and the third lens group on the optical axis are adjusted, so as to switch the zoom lens group from a wide-angle state to a long-focus state; and
   a total effective focal length FT of the zoom lens group in the long-focus state and a total effective focal length FW of the zoom lens group in the wide-angle state satisfy: FT/FW≥2.0,
   a curvature radius R9 of an object-side surface of the sixth lens and a curvature radius R10 of an image-side surface of the sixth lens satisfy: 1.32<R9/R10<1.4;
   a maximum field of view (FOVT) of the zoom lens group in the long-focus state satisfies: 10°<FOVT<13°;
   a curvature radius R4 of an object-side surface of the third lens and a curvature radius R6 of an object-side surface of the fourth lens satisfy: 0.59≤R4/R6<1.0;

an effective focal length f21 of the third lens, an effective focal length f23 of the fifth lens and an effective focal length f22 of the fourth lens satisfy: $1.0 < (f21+f23)/f22 \leq 1.18$;

the total effective focal length FT of the zoom lens group in a long-focus state and an effective focal length F3 of the third lens group satisfy: $1.1 < FT/F3 \leq 1.38$.

2. The zoom lens group as claimed in claim 1, wherein an effective focal length F1 of the first lens group and an effective focal length F2 of the second lens group satisfy: $-2.3 < F1/F2 < -1.8$.

3. The zoom lens group as claimed in claim 1, wherein an effective focal length F3 of the third lens group and an effective focal length F1 of the first lens group satisfy: $-1.1 < F3/F1 < -0.8$.

4. The zoom lens group as claimed in claim 1, wherein an effective focal length f11 of the first lens and an effective focal length f12 of the second lens satisfy: $-0.7 < f11/f12 < -0.4$.

5. The zoom lens group as claimed in claim 1, wherein a central thickness CT6 of the sixth lens on the optical axis, a central thickness CT1 of the first lens on the optical axis and a central thickness CT2 of the second lens on the optical axis satisfy: $0.2 < CT6/(CT1+CT2) < 1.8$.

* * * * *